(12) United States Patent
Lavoie

(10) Patent No.: US 10,607,634 B1
(45) Date of Patent: Mar. 31, 2020

(54) LIGHT MONITORING CIRCUIT FOR A MANUAL TO AUTOMATIC TURNTABLE CONVERSION

(71) Applicant: Thomas G. Lavoie, Renfrew, PA (US)

(72) Inventor: Thomas G. Lavoie, Renfrew, PA (US)

(*) Notice: Subject to any disclaimer, the term of this patent is extended or adjusted under 35 U.S.C. 154(b) by 0 days.

(21) Appl. No.: 16/179,920

(22) Filed: Nov. 3, 2018

Related U.S. Application Data

(63) Continuation-in-part of application No. 15/700,863, filed on Sep. 11, 2017, now Pat. No. 10,141,012.

(60) Provisional application No. 62/470,843, filed on Mar. 13, 2017.

(51) Int. Cl.
  *G11B 3/085* (2006.01)
  *G11B 3/095* (2006.01)
  *G11B 3/09* (2006.01)
  *G11B 3/06* (2006.01)

(52) U.S. Cl.
  CPC ...... *G11B 3/08512* (2013.01); *G11B 3/08522* (2013.01); *G11B 3/0957* (2013.01); *G11B 3/06* (2013.01); *G11B 3/085* (2013.01); *G11B 3/09* (2013.01)

(58) Field of Classification Search
  None
  See application file for complete search history.

(56) References Cited

U.S. PATENT DOCUMENTS

| 3,727,922 A | 4/1973 | Igata | |
| 3,937,903 A | 2/1976 | Osann, Jr. | |
| 4,093,832 A * | 6/1978 | Isaacson | G11B 3/02 250/214 B |
| 4,114,893 A | 9/1978 | Leach et al. | |
| 4,148,492 A * | 4/1979 | Bachelet | G11B 3/085 369/226 |
| 4,166,621 A * | 9/1979 | Isaacson | G11B 3/02 369/206 |
| 4,226,425 A | 10/1980 | Leach et al. | |

(Continued)

FOREIGN PATENT DOCUMENTS

| DE | 2839801 A1 | 6/1983 |
| JP | 58102303 A | 12/1983 |

(Continued)

OTHER PUBLICATIONS

Most Common and Most Budgeted Arduino Light Sensors, Intorobotics, Jan. 26, 2015, https://www.intorobotics.com/common-budgeted-arduino-light-sensors/.

(Continued)

*Primary Examiner* — Tan X Dinh
(74) *Attorney, Agent, or Firm* — William F. Lang, IV; Lang Patent Law LLC

(57) ABSTRACT

A light monitoring circuit for a manual to automatic record player conversion includes a reflected light sensor and an ambient light sensor. The reflected light sensor is used to determine whether a tonearm-raising piston is positioned under a blade secured to the tonearm. The ambient light sensor is used to detect the amount of ambient light. The signals from the ambient light sensor and reflected light sensor are provided to a circuit that modifies the signal from the reflected fight sensor based on the signal from the ambient light sensor, thereby reducing any likelihood of error due to variations in ambient light.

2 Claims, 28 Drawing Sheets

(56) References Cited

U.S. PATENT DOCUMENTS

| | | | |
|---|---|---|---|
| 4,301,526 A | 11/1981 | Morii et al. | |
| 4,398,278 A | 8/1983 | Suzuki | |
| 4,437,180 A | 3/1984 | Takeuchi | |
| 4,694,449 A | 9/1987 | Einhaus | |
| 10,141,012 B1 * | 11/2018 | Lavoie | G11B 3/085 |

FOREIGN PATENT DOCUMENTS

| | | |
|---|---|---|
| JP | 58212601 | 12/1983 |
| JP | 58215701 A | 12/1983 |
| JP | S58212602 | 12/1983 |
| JP | 60131602 A | 7/1985 |
| JP | 62257601 A | 11/1987 |

OTHER PUBLICATIONS

Amy Unger, Parts of a Record Player, The Klipsch Joint, Jun. 27, 2016, http://www.klipsch.com/blog/parts-of-a-record-player.

Texax Instruments, LM321 Low Power Single Operational Amplifier, Dec. 2014.

RES 6/010 Electronic Feedback Systems, Chapter XI Basic Applications, MIT Open Courseware, Spring 2013.

Op Amp Circuit Collection, National Semiconductor Application Note 31, Sep. 2002.

Texas Instruments Tlc5401, TLC5411 8-Bit Analog-To-Digital Converters With Serial Control and 11 Inputs. June 2001.

Turntable with High Resolution Recording, Sony, https://www.sony.com/electronics/audio-components/ps-hx500, at least as early as Sep. 11, 2017.

Clamper (electronics), Wikipedia, at least as early as Aug. 12, 2018.

Differential Amplifier, Wikipedia, at least as early as Aug. 12, 2018.

Stepper Motor, Shinano Kenshi, at least as early as Feb. 10, 2017.

DC 5v 2 phase 4-wire Mini Stepper Motor linear screw shaft lead nut slider Stage, Ebay, http://www.ebay.com/itm/DC-5v-2-phase-4-wire-Mini-Stepper-Motor-lin, Feb. 10, 2017 or earlier.

Operational Amplifier, Wikipedia, at least as early as Aug. 11, 2018.

Operational Amplifier Applications, Wikipedia, at least as early as Aug. 11, 2018.

Operational Amplifier Basics, at least as early as Aug. 11, 2018.

Raspberry Pi, Wikipedia, at least as early as Oct. 15, 2018.

Momentary Push Button Switch—12 mm Square, Karlsson Robotics, http://www.kr4.us/momentary-push-button-switch-12mm-square.html?gc, at least as early as Feb. 11, 2017.

Technics Grand Class Direct-Drive Turntable System SL-1200G, Panasonic, http://shop.panasonic.com/about-us-latest-news-news/05272016-technics.html, Sep. 8, 2017 or earlier.

Gramphone Record, Wikipedia, https://en.wikipedia.org/wiki/Gramophone_record, at least as early as Feb. 16, 2017.

Chanzon White LED Lights, Amazon, https://www.amazon.com/Transparent-Lighting-Electronics-Components-Emitting/dp/B01BtyHOMC/ref=sr_1_1?ie=UTF8&qid=1504894666&sr=8-1&keywords=c Feb. 11, 2017.

* cited by examiner

LIGHT MONITORING CIRCUIT FOR A MANUAL TO AUTOMATIC TURNTABLE CONVERSION

CROSS REFERENCE TO RELATED APPLICATION

This application is a continuation in part of U.S. patent application Ser. No. 15/700,863, which was filed on Sep. 11, 2017 and entitled "Manual to Automatic Turntable Player Conversion," which claims the benefit of U.S. provisional patent application No. 62/470,843, which was filed on Mar. 13, 2017 and entitled "Manual to Automatic Record Player Conversion."

TECHNICAL FIELD

The present invention relates to record players. More specifically, a device for converting a manual record player to an automatic record player is provided.

BACKGROUND INFORMATION

Despite the prevalence of music sold on compact discs and MP3 files, records are still regarded by some audiophiles as producing the best sound quality when playing the music stored thereon. Record players rely on a tone arm having a needle or stylus that follows a spiral, modulated groove defined within the surface of the record. The stylus is operatively connected to an electromagnetic pickup, which converts the stylus movements into an electrical signal. This electrical signal is amplified and then supplied to a speaker. While CD's and MP3 files store the music digitally, records store the music in an analog format.

Unlike CD's or MP3 files, users of manual record players must manually move the record player's tone arm to the starting location of the desired song on the record. Various automatic record players automatically detect the locations between songs, and position the tonearm accordingly. However, the additional hardware needed for automatic tone arm movement increases the weight of the tonearm, which impacts the sensitivity of the tonearm. While some manual record players can track to 0.5 grams, the best automatic record players can only track to 1.5 grams, thus reducing the sound quality of the record player.

An example of a presently available automated record player system is U.S. Pat. No. 4,398,278, which discloses a record player program selector. The programs on the record are separated by inter-program gaps. The reflectivity of the surface of the record at locations where sound grooves are located is different from the reflectivity of the surface of the inter-program gaps. A photo sensor mounted on the housing of the turntable is utilized to determine the location of each inter-program gap. The location of the lead-in groove of the record can also be detected using the light sensor. The desired track is selected using a selector switch, and the inter-program gap located before the desired program is set as the location to which the tone arm should be moved. A light source and light sensor on the tonearm is used in connection with an optically detectable radial scale to determine the position of the tonearm as it moves across the surface of the record. The tonearm position sensor is compared to the inter-program gap signal to determine whether the tonearm is in the location of the selected program. Alternatively, the radial scale can be spaced magnetic elements that are sensed by a magnetic sensor on the tonearm. The user may select the desired track using a selector switch.

DE 2839801 discloses a record player tone arm vertical and rotary motion control. A follower and lift platform coaxial with the tone arm and driven by the player motor is used. The device can be controlled remotely.

JP 62257601 discloses a remote control for a record player, allowing the tonearm to be elevated and then rotated to a desired position on a record.

JP 58215701 discloses a device for engaging the tonearm and a lifting mechanism. The tonearm is free to move horizontally when the lifting mechanism is disengaged.

JP 58102303 discloses an elevator for a tonearm. The elevator includes an auxiliary arm on the tonearm, and a receiving plate for contacting the auxiliary arm. The receiving plate is part of a piston rod.

U.S. Pat. No. 4,694,449 discloses a record player with a pickup arm lift rod. The lifting device includes a horizontal arm support formed integrally with a vertical lifting rod. The lifting rod fits within a square tubular guide element that is integrally formed with the deck. The lower end of the lift rod engages an actuating member having a pair of support surfaces at different levels, connected by a ramped surface. Sliding the actuating member thereby raises and lowers the lift rod. An angled compression spring both biases the lift rod downward, and pushes the lift rod against a pair of the guide surfaces. Silicon lubricant is maintained between the lift arm and the guide surfaces by capillary action.

U.S. Pat. No. 4,437,180 discloses an apparatus for controlling a pickup arm in a record or video disc player. An optical detector is located at the foremost end of the pickup arm for detecting a non-recorded groove portion. The tonearm moves until a selected non-recorded groove portion is reached, and then the tonearm is lowered. The light sensor includes an LED and a phototransistor. A pickup arm position detecting section includes a photo coupler having a light emitting diode and a phototransistor facing each other, with a shutter plate. A counter is used to track the number of the song on which the stylus is positioned. A second counter, which is set by the number of depressions of the play button, is used to select the desired song. A pickup arm lifter controlling circuit is used to raise the pickup arm when the stop button is depressed, and to lower the pickup arm when the pickup arm is in a desired location. A pickup arm horizontal controlling circuit moves the pickup arm towards the center of the record, unless the stop button is depressed, in which case the pickup arm is moved outward. Manual control of the pickup arm is also provided. When operated in automatic mode, the pickup arm is moved inward until the count value equals the designated number of the piece selected. At this point, the pickup arm will overswing the desired location, but then be brought back by the reversing controlling section for a tiny distance, and then positioned accurately above the non-recorded portion of the groove located immediately before the designated number of piece of music. The pickup arm is then lowered.

U.S. Pat. No. 4,301,526 discloses a tonearm control system. The tonearm is moved along a worm gear. A shutter attached to the worm gear is placed between a light source and a light sensor, so that the light pulses detected by the light sensor can be used to indicate the absolute position of the tonearm. A sensor on the on the tonearm detects gaps between grooved sections on a record. The user may elect to play songs on the record in a given order. The tonearm moves to the location of the song from its start position by counting spaces on the record between grooved song sections, remembering each tone arm position in which a section between songs is detected.

U.S. Pat. No. 4,114,893 discloses gramophone equipment incorporating a means of permitting a user to play selected tracks. A photoelectric sensor located at the end of the tonearm is used to detect bands between record tracks. A counter is used to count the detected bands. Track selections may be input and stored into memory. Control circuitry is provided for lifting the tonearm as well as for driving the tonearm laterally to the desired location.

U.S. Pat. No. 3,937,903 discloses a soundtrack selector system for phonograph record players. The stylus pickup arm includes an infrared light emitter and light sensor, directing light to the face of the phonograph record and receiving reflected light. Bands between recorded songs are thereby detected. An optical encoder is used to detect the peripheral position of the pickup arm with respect to the record. The pickup arm is moved using a pulse motor that is geared down sufficiently to give the necessary incremental resolution. The use of the encoder's output signal to supplement the detector signal in the pickup arm eliminates the elaborate optical detection techniques utilized by other systems. The user may select the specific bands of the record to be played. The system can be extended to multiple records, tracking not only the band being played but also the record within the group of records that is being played.

U.S. Pat. No. 3,727,922 discloses a tonearm lifting device for an automatic record player. The lifting mechanism includes a cylinder with a piston slidably mounted therein. A lifting rod is secured within the piston, and a lifting plate for the tonearm is mounted on the lifting rod. An eccentric cam is used to move the piston upward.

JP 60131602 discloses the use of a remote control solenoid for raising and lowering the tonearm of a record player.

U.S. Pat. No. 4,226,425 discloses a nonrecorded section detection scanner mounted on a sensor arm. The sensor arm is mounted to a rotating shaft having a drive mechanism and a slit plate fixed to the shaft. The slit plate is used to detect to the rotation of the shaft so that the location of nonrecorded sections between adjacent tracts of a record can be located. The tonearm includes a drive shaft having another slit plate to detect the address of the pickup cartridge. Each of the slip plates includes a slit plate sensor having a light emitting diode on one side of the slit plate, and a photosensitive transistor on the other side of the slit plate. A counter is connected to each of the sensors to count the pulse signals derived therefrom.

Accordingly, there is a need for an automatic record player having the tonearm sensitivity of a manual record player. There is a further need for a means of converting a manual record player to an automatic record player without affecting the sensitivity of the tonearm. Additionally, there is a need for a manual to automatic record player conversion that minimizes the amount of weight added to the tone arm.

SUMMARY

The above needs are met by a control system for an automatic record player. The automatic record player has a tonearm and a motor-driven piston assembly for moving the tonearm. The control system includes a central processing unit operatively connected to the motor-driven piston assembly. The central processing unit is structured to cause the motor-driven piston assembly to move the tonearm to a preselected location. The control system further has a tracking system that is structured to track a location of the motor-driven piston assembly and the tonearm. The tracking system is operatively connected to the central processing unit. The control system also includes a local database structured to store a plurality of positions of starting locations of songs on a record. The database is operatively connected to the central processing unit. The central processing unit controls the motor-driven piston assembly to move the tonearm to a location that is stored within the local database.

The above needs are additionally met by a method of determining song starting positions on a record. The method includes providing an automatic record player having a tonearm, a motor-driven piston assembly for moving the tonearm, and a control system. The control system includes a central processing unit operatively connected to the motor-driven piston assembly. The central processing unit is structured to cause the motor-driven piston assembly to move the tonearm to a preselected location. The control system further has a tracking system that is structured to track a location of the motor-driven piston assembly and the tonearm. The tracking system is operatively connected to the central processing unit. The control system also has a local database structured to store a plurality of positions of starting locations of songs on a record. The database is operatively connected to the central processing unit. The method further includes identifying song starting points based on a distance of travel of the motor-driven piston assembly or a distance of travel of the tonearm required to move a tonearm from a predetermined position to the starting point of each song.

The above needs are further met by a conversion device for converting a manual record player to an automatic record player. The conversion device comprises a base unit that is structured to be secured to the housing of the manual record player below a portion of the range of motion of the tonearm. The base unit comprises a first drive assembly having a first motor. The first drive assembly is operatively connected to a first carriage assembly. The first drive assembly is structured to move the first carriage assembly between a first position and a second position, with the first position corresponding to the rest position of the tonearm, and the second position corresponding to the record ending position of the tonearm. The first carriage assembly comprises a second drive assembly having second motor. The second motor is operatively connected to a second carriage. The second drive assembly is structured to move the second carriage between a lower position and an upper position. The second carriage is structured to engage a carriage-engaging tonearm element, and to elevate the tonearm, when the carriage is in its upper position. The second carriage is further structured to disengage the carriage-engaging tonearm element when in the lower position. The conversion device further comprises a control system. The control system is structured to selectively raise and lower the second carriage, and to selectively move the first carriage towards the first position and the second position. The tonearm may thereby be moved to a preselected position by moving the second carriage under the carriage-engaging tonearm element, raising the second carriage, moving the first carriage generally horizontally until the tonearm is in a preselected position, and lowering the second carriage.

The above needs are additionally met by a circuit for monitoring light, the circuit comprises a first light sensor and a second light sensor. The circuit further includes an operational amplifier having a non-inverting input, an inverting input, and an output. The non-inverting input is electrically connected to the second light sensor. The inverting input is electrically connected to a voltage source, as well as to the output of the operational amplifier. The circuit further comprise a first transistor having a first base, a first collector, and a first emitter. The first base is electrically connected to the output of the operational amplifier. The first collector is electrically connected to the second light sensor, and the first emitter is electrically connected to ground. The circuit includes a second transistor having a second base, a second collector, and a second emitter. The second base is electrically connected to the output of the operational amplifier. The second collector is electrically connected to the first light sensor, and the second emitter is electrically connected to ground. The first light sensor and second collector are electrically connected to a first circuit output. The voltage provided to the output by the first light sensor is thereby modified by the voltage provided by the second light sensor.

The above needs are additionally met by an automatic record player. The automatic record player comprises a housing, a turntable disposed on the housing, and a tonearm disposed on the housing. The automatic record player further comprises a base unit secured to the housing below a portion of the range of motion of the tonearm. The base unit comprises a first drive assembly having a first motor. The first drive assembly is operatively connected to a first carriage assembly. The first drive assembly is structured to move the first carriage assembly between a first position and a second position, with the first position corresponding to the rest position of the tonearm, and the second position corresponding to the record ending position of the tonearm. The first carriage assembly comprises a second drive assembly having second motor. The second motor is operatively connected to a second carriage. The second drive assembly is structured to move the second carriage between a lower position and an upper position. The second carriage is structured to engage a carriage-engaging tonearm element, and to elevate the tonearm, when the carriage is in its upper position. The second carriage is further structured to disengage the carriage-engaging tonearm element when in the lower position. The automatic record player further includes a control system that is structured to selectively raise and lower the second carriage, and to selectively move the first carriage towards the first position and the second position. The tonearm may thereby be moved to a preselected position by moving the second carriage under the carriage-engaging tonearm element, raising the second carriage, moving the first carriage generally horizontally until the tonearm is in a preselected position, and lowering the second carriage.

The above needs are further met by a method of tracking a tonearm of a turntable utilizing an automatic tonearm moving device. The automatic tonearm moving device has a blade secured to the tonearm of the turntable. The blade has a bottom surface having a reflective surface portion which defines a leading edge and a trailing edge. The automatic tonearm moving device further comprises a first drive assembly having a first motor. The first drive assembly is operatively connected to a first carriage assembly. The first drive assembly is structured to move the first carriage assembly between a first position and a second position, with the first position corresponding to the rest position of the tonearm, and the second position corresponding to the record ending position of the tonearm. The first carriage assembly comprises a second drive assembly having a second motor. The second motor is operatively connected to a second carriage. The second drive assembly is structured to move the second carriage between a lower position and an upper position. The second carriage is structured to engage a carriage-engaging tonearm element, and to elevate the tonearm, when the carriage is in its upper position. The second carriage is further structured to disengage the carriage-engaging tonearm element when in the lower position. A light source and a first light sensor are disposed on the first carriage assembly. The first light sensor is positioned to receive light from the light source that is reflected from the reflective surface portion of the blade. The first light sensor outputs a voltage in response to light received by the first light sensor. The automatic tonearm moving device further includes a control system, with the control system being structured to selectively raise and lower the second carriage, and to selectively move the first carriage towards the first position and the second position The method of tracking the tonearm with the above-described device comprises moving the first carriage assembly to its first position. The method further comprises moving the carriage assembly towards its second position until the first light sensor detects an amount of light falling between a high threshold and a low threshold, with the low threshold being selected as a lowermost value at which the carriage assembly is substantially aligned with an edge of the reflective surface portion, the high threshold being selected as a highest value at which the carriage assembly is substantially aligned with an edge of the reflective surface portion. The method includes monitoring the first light sensor to determine whether the light received by the first sensor increases beyond a predetermined high threshold or decreases below a predetermined low threshold. The first carriage assembly is moved in a direction which increases the light received by the first light sensor in the event that the light received by the first light sensor falls below the low threshold. The first carriage assembly is moved in a direction which decreases the light received by the first light sensor in the event that the light received by the first light sensor rises above the high threshold.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
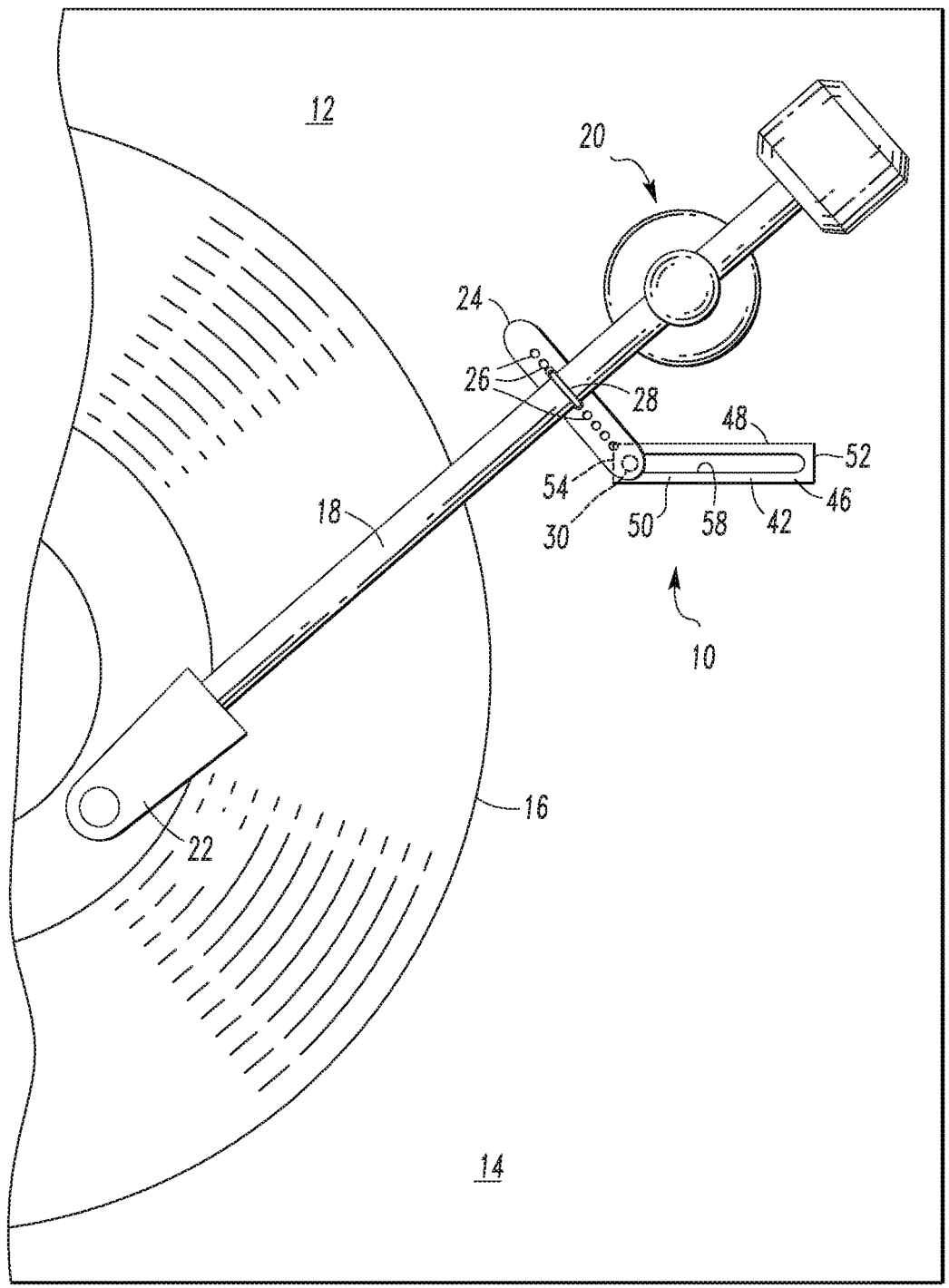
FIG. 1 is a top plan view of a manual record player having a manual to automatic record player conversion device, showing a first mounting orientation, and the tone arm positioned over the record.

Referring to the drawings, an example of a manual to automatic record player conversion device 10 is illustrated. The manual record player with which the conversion device 10 is used is well known to those skilled in the art, and is therefore only described briefly herein. The manual record player 12 includes a housing 14 supporting a turntable 16 and tonearm 18. The tonearm 18 includes a pivot assembly 20 that is structured to provide for both horizontal and vertical rotation of the tonearm 18 about the pivot assembly 20, and a record engaging end 22 having a stylus operatively connected to an electromagnetic pickup therein.

Referring to FIGS. 1-6, the device 10 includes a blade 24, which in the illustrated example is generally elongated, is made of a rigid, lightweight material, and is structured for attachment to the tonearm 18. Suitable materials for the tonearm 18 include, but are not limited to, aluminum alloys, titanium, and a variety of rigid polymers. It is generally preferable to attach the blade 24 to the tonearm 18 as close is practical to the pivot structure 20, thereby minimizing the impact of the weight of the blade 24 on the sensitivity of the tonearm 18. In the illustrated example of the blade 24, a plurality of apertures 26 are defined along its length for receiving a fastener 28 passing around the tonearm 18 and through two of the apertures 26. The plurality of mounting holes defined within some examples of the blade 24 provide a means for adjusting the position of the blade 24 with respect to the tonearm 18, thus ensuring that some portion of the slot 32 as described below is always positioned for engagement by the piston 72 as described below, regardless of the position of the tonearm 18. Although in the illustrated example the blade 24 is generally perpendicular to the tonearm 18, other orientations with respect to the tonearm 18 may be used without departing from the invention.

The blade 24 includes a piston engaging end 30, defining a slot 32 therein. In the illustrated example, the slot 32 is generally perpendicular to the blade 24, but other orientations of the slot 32 are possible without departing from the invention depending upon the specific installation of the device 10 on the record player 12, as described in greater detail below. Some examples of the slot 32 can be partially defined by an upwardly extending sidewall 34, which in the illustrated example is frustoconical. The piston engaging end 30 of the blade 24 also includes a reflective strip 36, which in the illustrated example is elongated and generally parallel to the slot 32. The opposite end 38 of the blade 24 includes a lip 40 in the illustrated example.

Figure 7:
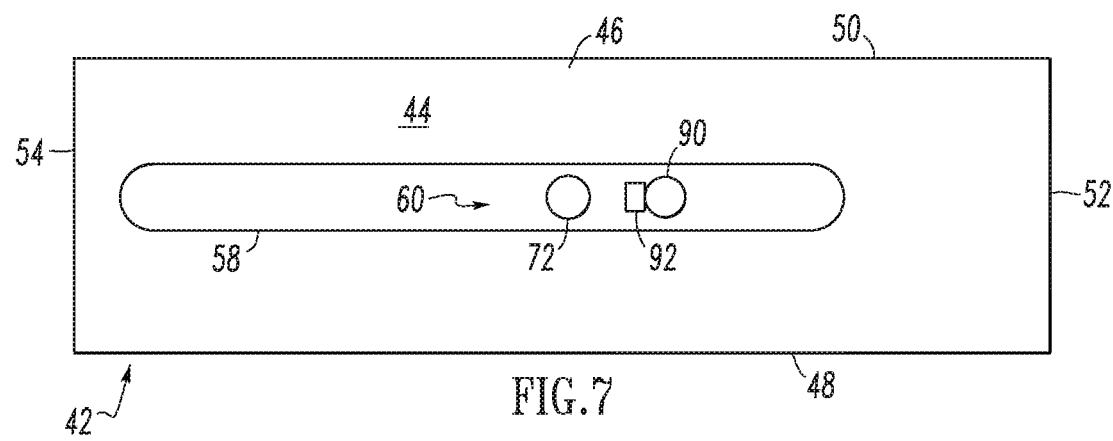
FIG. 7 is a top view of a base unit for the manual to automatic record player conversion device of FIG. 1.
Figure 8:
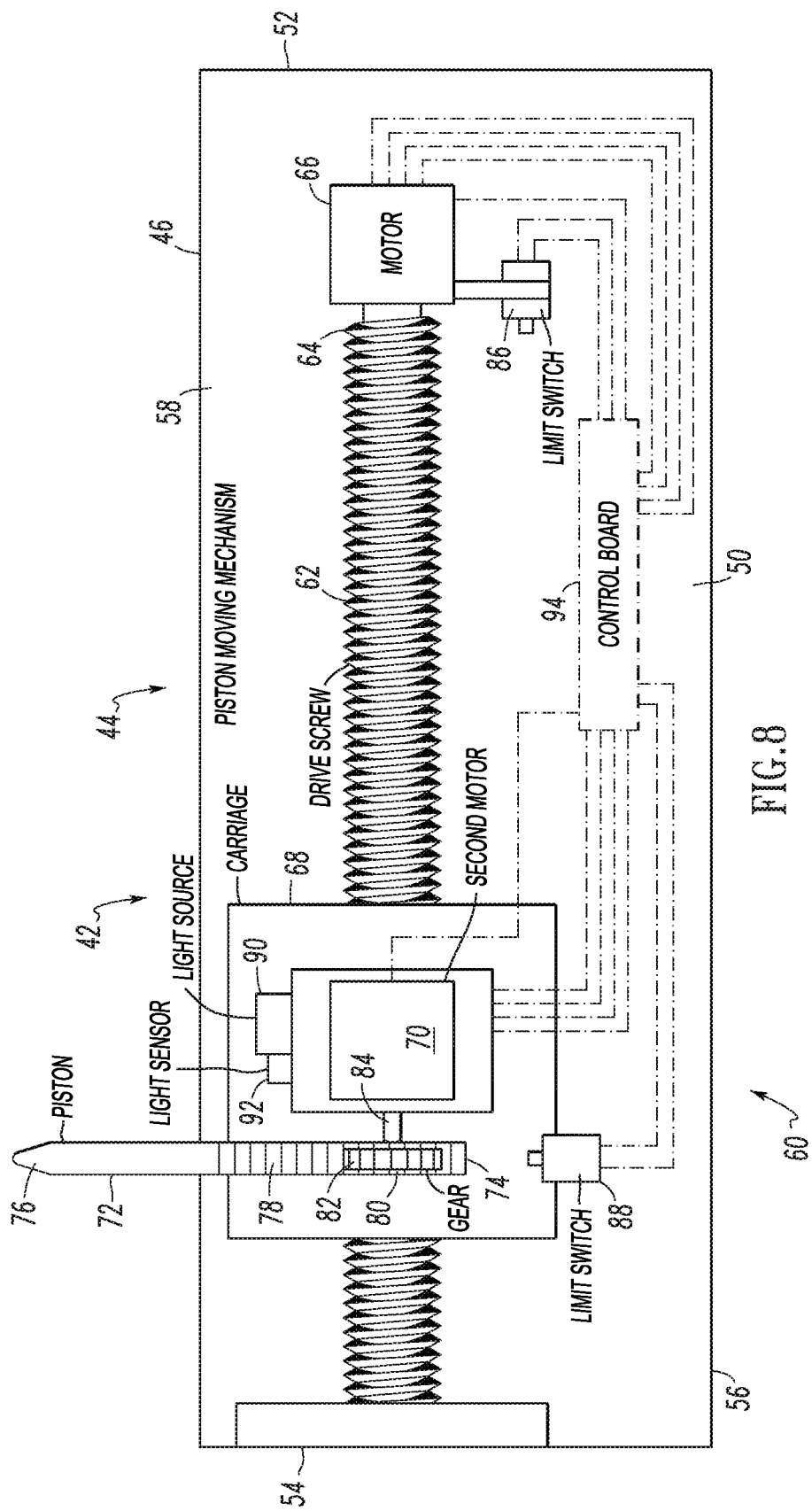
FIG. 8 is a partially cutaway side elevational view of the base unit for a manual to automatic record player conversion device of FIG. 1.
Figure 9:
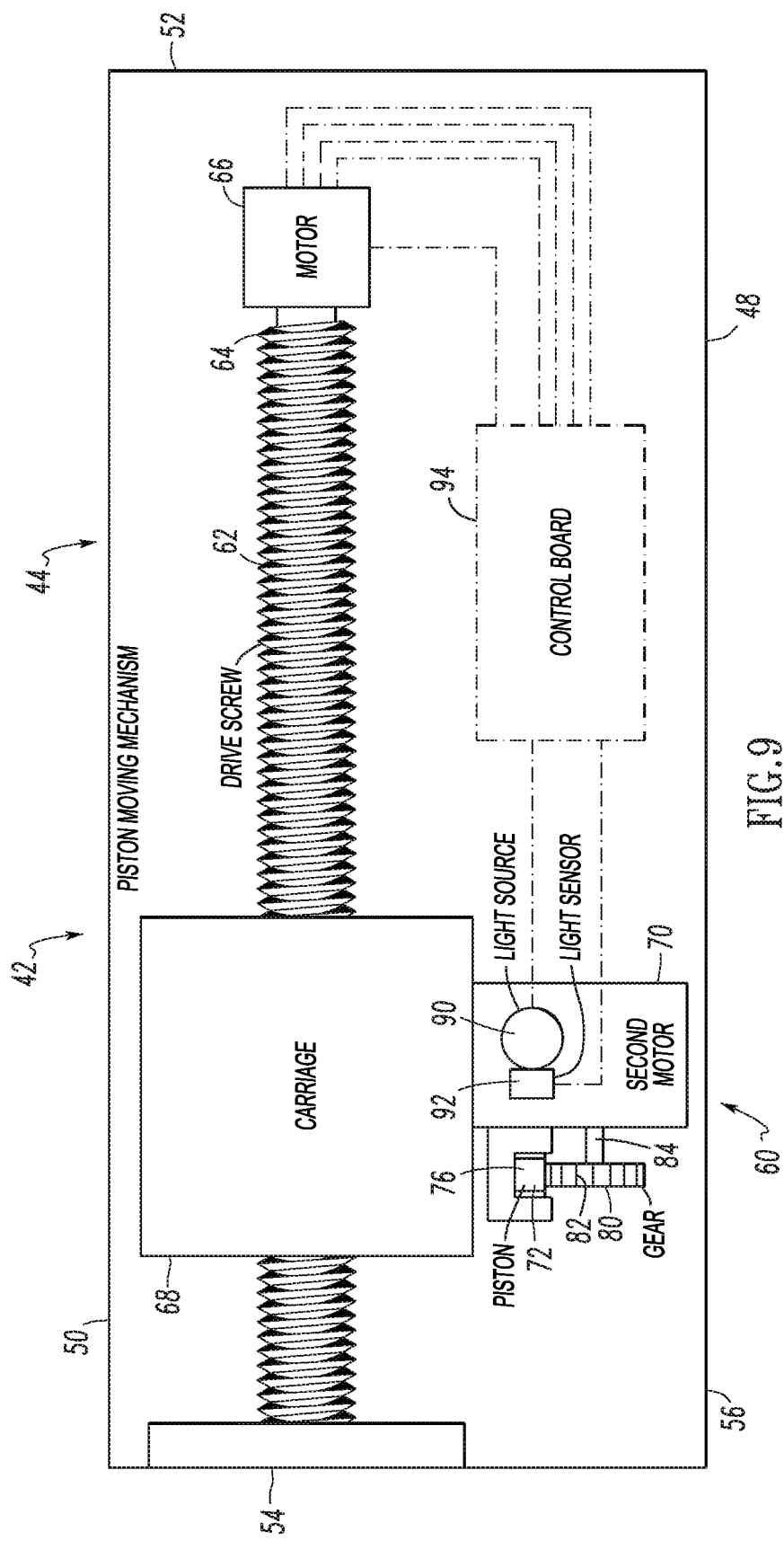
FIG. 9 is a partially cutaway top plan view of the base unit for a manual to automatic record player conversion device of FIG. 1.

Continuing to refer to FIGS. 1-6 as well as FIGS. 7-9, the base unit 42 of the device 10 includes a housing 44 having a top 46, opposing sides 48, 50, opposing ends 52, 54, and a bottom 56. The top 46 defines a slot 58 therein, with the slot 58 of the illustrated example being generally parallel to the housing 44. The bottom 56 is structured to be secured to the housing 14 of the record player. Securing the bottom 56 to the housing 14 of the record player can be accomplished using a variety of methods, including temporary or permanent adhesives, hook and loop fasteners, corresponding fastener portions having interlocking mushroom shaped fasteners, of the type marketed under the trademark DUAL LOCK by 3M, located in St. Paul, Minn., or using mechanical fasteners such as screws or rivets.

Figure 2:
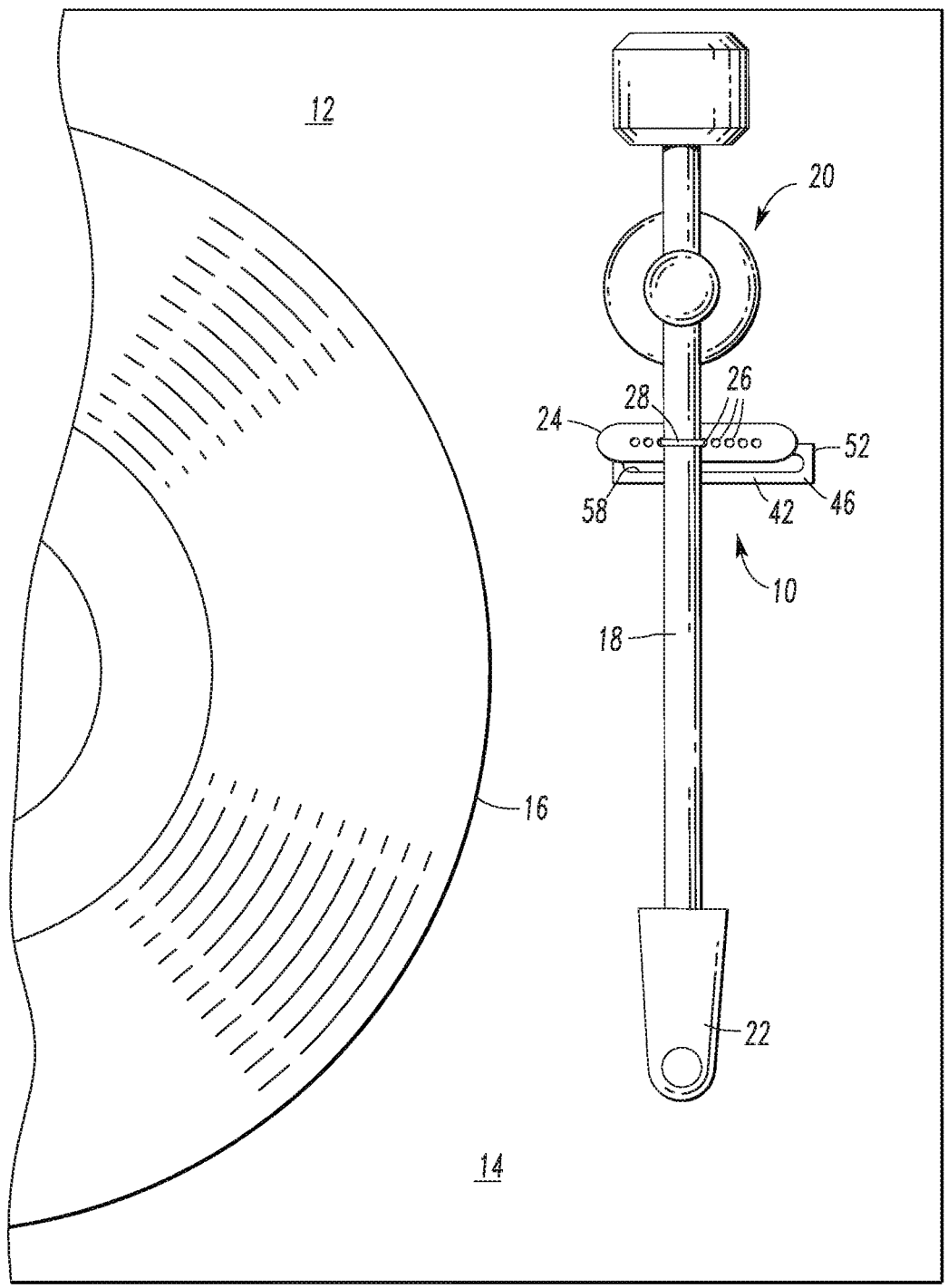
FIG. 2 is a top plan view of manual record player having a the manual to automatic record player conversion device of FIG. 1, showing a first mounting orientation, and the tone arm positioned in its rest position.
Figure 3:
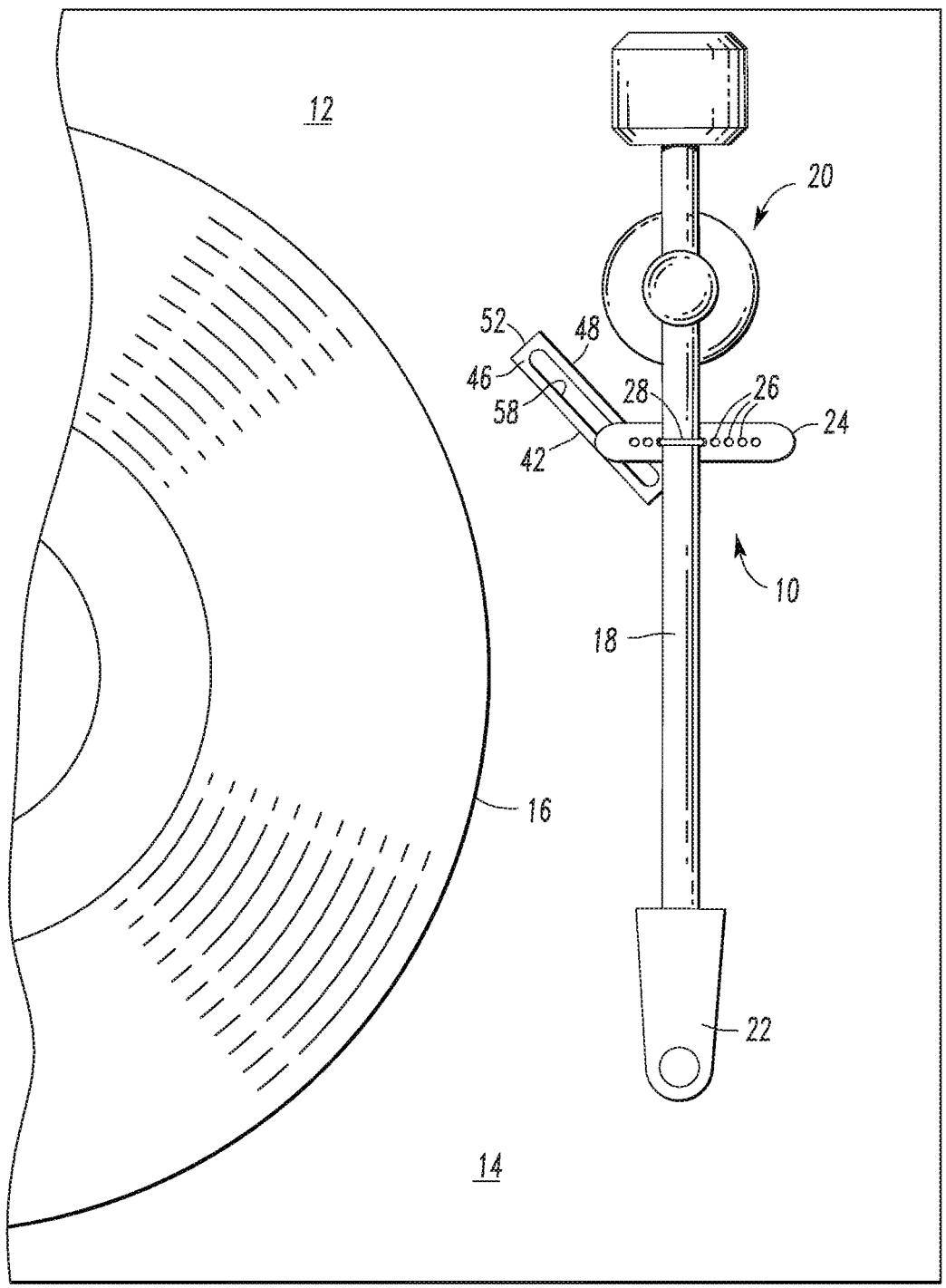
FIG. 3 is a top plan view of manual record player having a the manual to automatic record player conversion device of FIG. 1, showing a second mounting orientation, and the tone arm positioned in its rest position.
Figure 4:
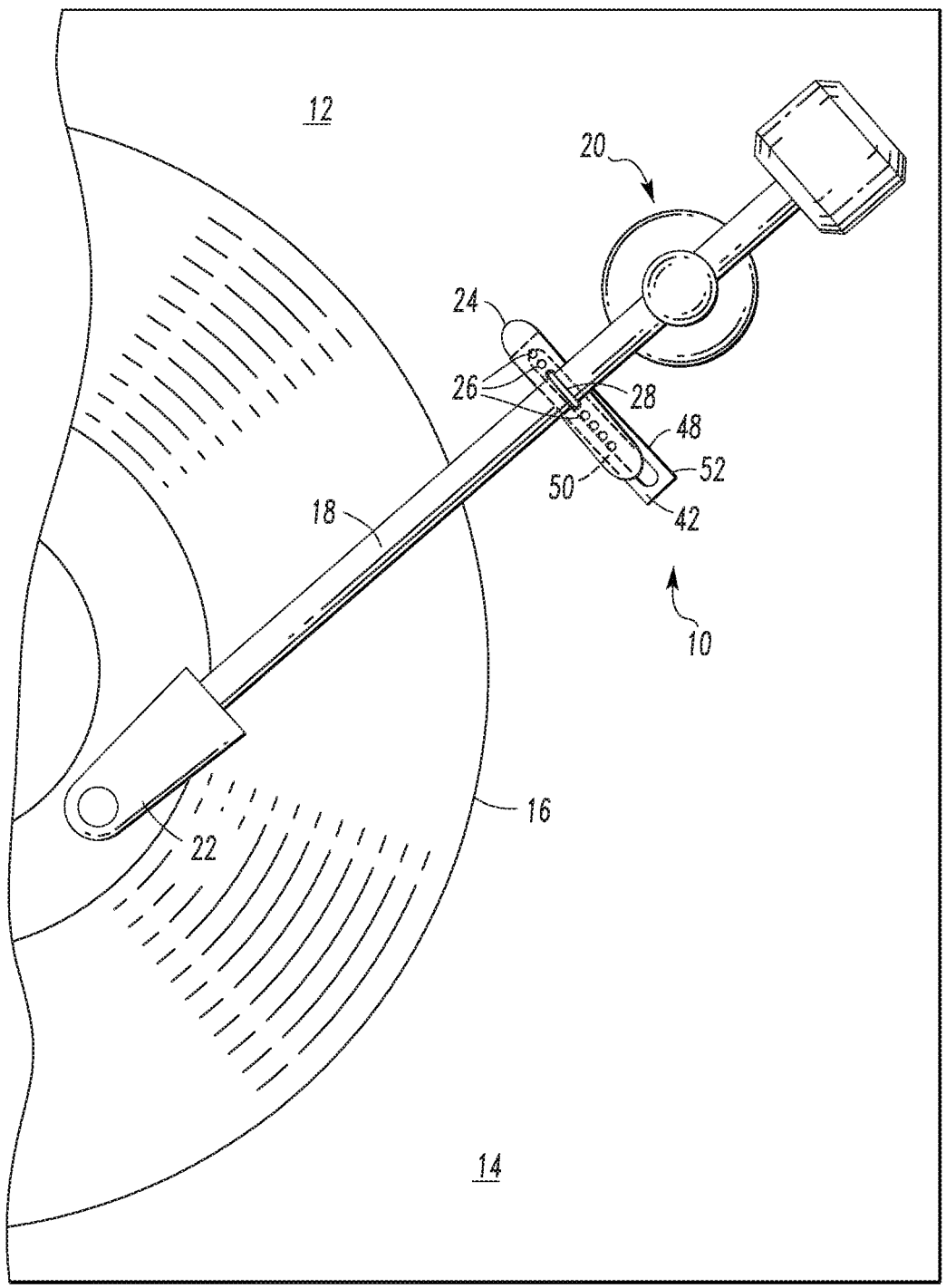
FIG. 4 is a top plan view of manual record player having a the manual to automatic record player conversion device of FIG. 1, showing a second mounting orientation, and the tone arm positioned over the record.

The housing 44 can be secured to the record player housing 14 in either the first (standard) position illustrated in FIGS. 1-2, or the second (reverse) position illustrated in FIGS. 3-4, as described in greater detail below. In the standard position of FIGS. 1-2, the housing 42 is oriented so that the housing 42 is generally perpendicular to a tangent to the edge of the turntable 16. In the reverse position of FIGS. 3-4, the housing 42 is oriented generally parallel to a tangent to the turntable 16. In either case, the housing 42 is positioned relatively close to the pivot assembly 20 of the tonearm 18. Mounting structures of different heights can be utilized to accommodate different record players 12. In all cases, exact positioning of the blade 24 on the tonearm 18 as well as the exact positioning of the housing 42 on the record player housing 14 is determined to permit automated movement of the tonearm 18 between its rest position and its position within the lead out groove of a record on the turntable 16.

Referring more specifically to FIGS. 7-9, the piston moving mechanism 60 is illustrated. The illustrated example of piston moving mechanism 60 includes a drive screw 62 that is operatively connected at its first end 64 to a motor 66. The illustrated example of the motor 66 is an electrical stepper motor 66 that is capable of being driven by a calibrated stepper motor drive system that provides positional feedback based on an initial position of the stepper motor and degree of rotation from that initial position. The drive system for the illustrated example of the stepper motor 66, which is not described in detail herein because stepper motor drive systems are well known to those skilled in the art, includes to output drivers, with each driver having reversing polarity.

A carriage 68 is threadedly engaged to the drive screw 62 so that rotation of the drive screw 62 causes translation of the carriage 68 along the length of the drive screw 62. The illustrated example of the carriage 68 includes another motor 70, which in some examples may be the same type of motor as the stepper motor 66. If an electrical stepper motor that is capable of being driven by a calibrated stepper motor drive system is selected as the motor 70, and the position of the motor 70 is also known based on the initial position and degree of rotation. The motor 70 is used to raise and lower a piston 72 having a lower portion 74 and an upper and 76. The illustrated example of the upper end 76 of the piston 72 has a tapered configuration, with the taper of the upper end 76 substantially matching the angle of the side wall 34 of the slot 32. The upper end 76 of the piston 72 has a width that is approximately equal to or greater than the width of the slot 32.

The lower portion 74 of the piston 72 Includes piston drive engaging elements. In the illustrated example, the lower portion 74 includes a plurality of teeth 78 extending along one side of the piston 72. The teeth 78 are structured to mesh with the teeth 80 of the gear 82 that is connected to the drive shaft 84 of the motor 70. Thus, rotation of the motor 70 and a first direction rotates the gear 82 in a direction that raises the piston 72. Similarly, rotation of the motor 70 in the opposite direction rotates the gear 82 and a direction that lowers the piston 72.

A limit switch 86 is disposed adjacent to one end of the drive screw 62, so that when the carriage 68 reaches its limit of travel at that and of the drive screw 62, the limit switch 86 is activated, providing a signal indicating the location of the carriage 68. Once the limit switch 86 has been activated, the position of the carriage 68 is known by tracking the rotation of the motor 66. Similarly, a limit switch 88 is disposed adjacent to one end of travel of the piston 72, so that the limit switch 88 is activated when the piston 72 is at one extreme of its range of travel. In the illustrated example, the limit switch 88 corresponds to the lowermost position of the piston 72. Once the limit switch 88 has been activated, the position of the piston 72 can be tracked by tracking rotation of the motor 70. Although the illustrated example utilizes stepper motors with position indicating drivers, other alternative devices and methods for tracking movement, for example, utilizing encoders, would not depart from the scope of the invention.

A light source 90, which in the illustrated example is a light emitting diode, and a light sensor 92, which in the illustrated example can be either a photodiode or phototransistor, are positioned adjacent to each other on the carriage 68. The light source 90 is positioned to direct light upward through the slot 58, and the light sensor 92 is positioned to receive light reflected downward through the slot 58. Thus, when the light source 90 is positioned under the reflective strip 36 of the blade 24, the reflective strip 36 will reflect light from the light source 90 to the light sensor 92, thus indicating the position of the carriage 68 with respect to the blade 24. The positioning of the reflective strip 36 with respect to the slot 32, as well as the positioning of the light source 90, light sensor 92, and piston 72, are selected so that when the light source 90 and light sensor 92 are positioned below the reflective strip 36, the piston 72 is below the slot 32. In this position, raising the piston 72 will cause the tapered top end 76 of the piston 72 to engage the angled side wall 34 of the slot 32, thus raising the tonearm 18. Movement of the carriage 68 along the drive screw 62 will then move the tone arm 18 from its current position to a desired position. The piston 72 can then be lowered to lower the tonearm 18. The slot 32 is structured to accommodate the difference between the longitudinal motion of the carriage 68 as well as the rotational motion of the tonearm 18. The tapered top end 76 of the piston 72 and angled side wall 34 of the slot 32 accommodate and correct any positioning errors between the piston 72 and slot 32.

Figure 5:
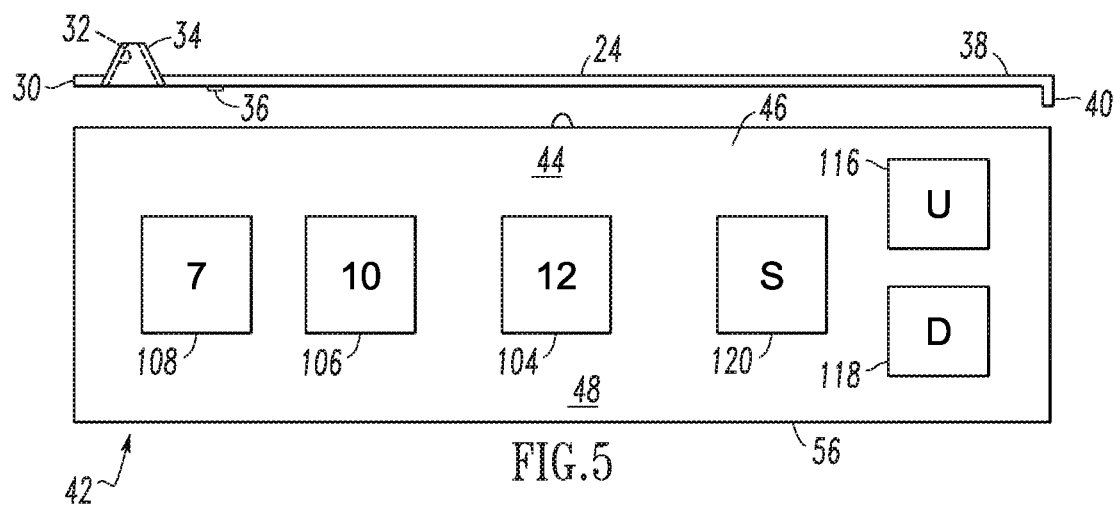
FIG. 5 is a side elevational view of the manual to automatic record player conversion device of FIG. 1.
Figure 6:
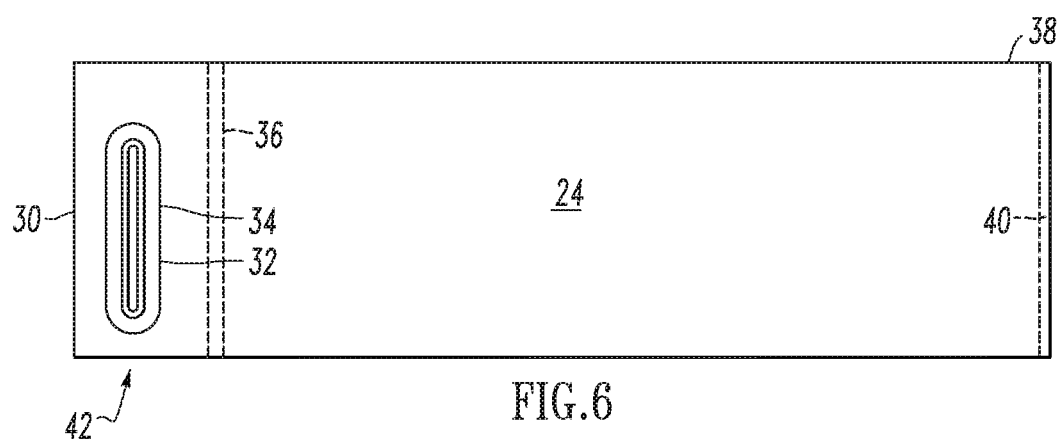
FIG. 6 is a top view of a blade for the manual to automatic record player conversion device of FIG. 1.
Figure 10:
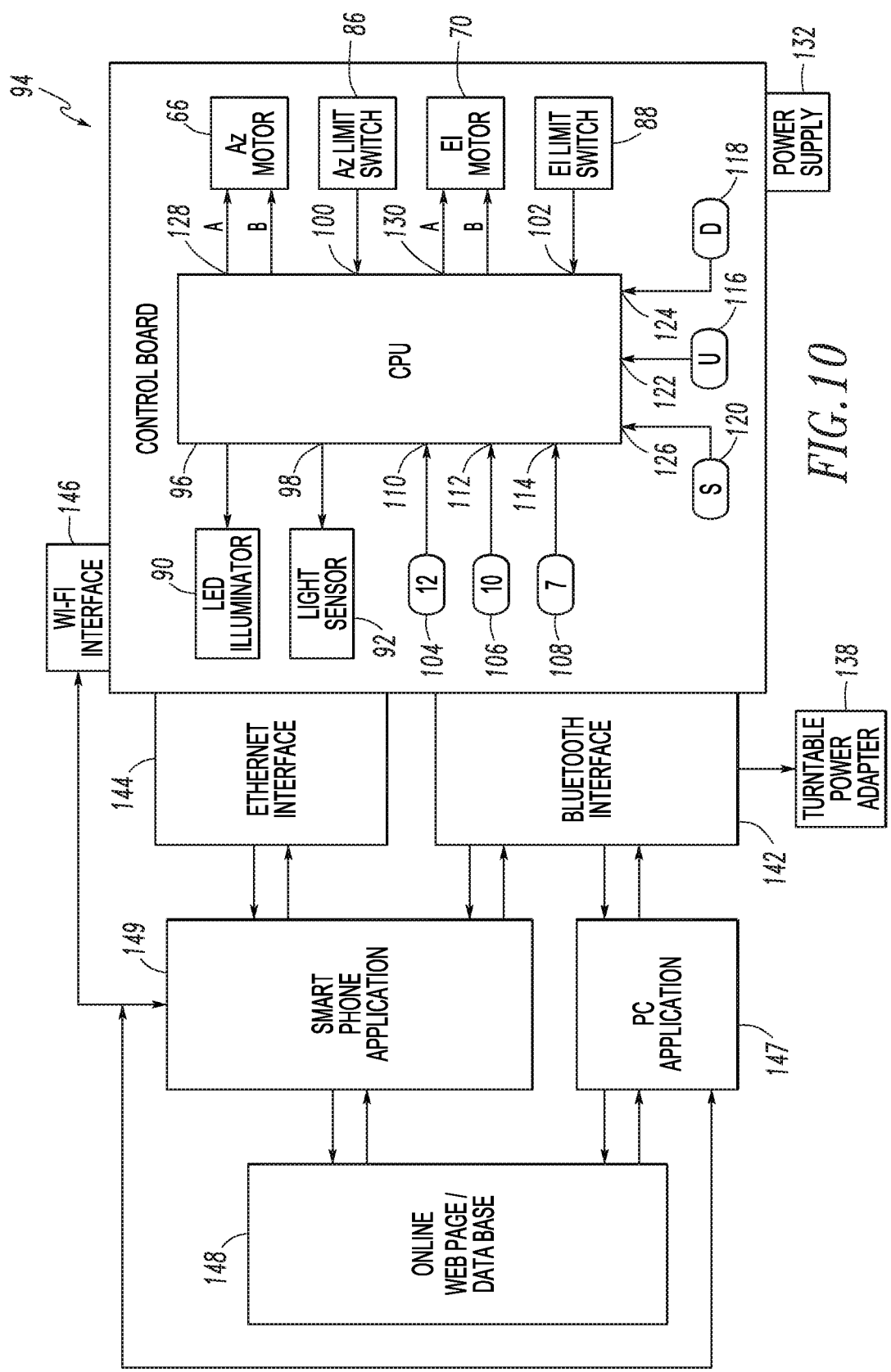
FIG. 10 is a schematic diagram of the electrical components of the manual to automatic record player conversion device of FIG. 1.

Referring to FIGS. 5, 9, and 10, a control board 94 and associated control hardware is illustrated. The control board 94 includes a central processing unit 96, which in the illustrated example is a microcontroller. The microcontroller 96 can be selected from a variety of different types of controllers. Possible microcontrollers 96 include general-purpose programmable microcontrollers, programmable logic devices such as field programmable gate arrays, application specific integrated circuits, and custom integrated circuits. The microcontroller 96 includes a variety of input and output ports for receiving information and commands as well as for outputting control signals. In the illustrated example, the microcontroller 96 includes a light sensor port 98, as well as limit switch ports 100, 102 for the limit switches 86, 88, respectively. The illustrated example provides a control for selecting the size of the record, which in the illustrated example includes the button 104 for selecting a 12 inch record, button 106 for selecting a 10 inch record, and button 108 for selecting a 7 inch record. The signals from the buttons 104, 106, 108 are provided to the ports 110, 112, 114, respectively. The illustrated example also provides buttons 116 for raising the tonearm, button 118 for lowering the tonearm, and button 120 for moving the tonearm onto the turntable rest. The buttons 116, 118, 120 are provided to input ports 122, 124, 126, respectively. Signals to the motor 66 are provided through output port 128. Similarly, signals to the motor 70 or provided through output port 130.

Figure 17:
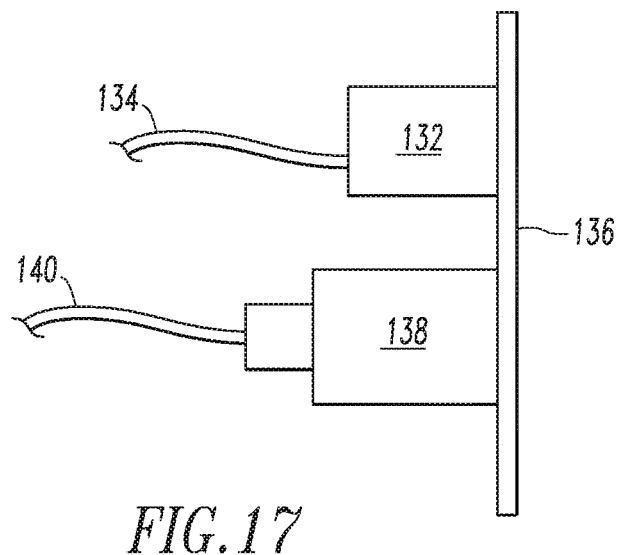
FIG. 17 is a top plan view of is a top plan view of a manual record player having a manual to automatic record player conversion device of FIG. 1, showing a power supply.

A power supply 132 is provided. In the illustrated example, the power supply 132 (FIG. 17) includes a power cord 134 for connecting to a standard 110 V outlet 136. Additionally, a plug unit 138 is provided between the power cord 140 of the turntable 12 and the wall outlet 136. The plug unit 138 is equipped with a switch, as well as a microcontroller connected to the switch. The microcontroller includes a wireless receiver such as Bluetooth, Wi-Fi, or other wireless technology, so that the plug unit 138 can communicate with the control board 94. The plug unit 138 can thus be used to switch on and off power to the turntable 12. Thus, electrical power can be supplied or deactivated to the turntable 12 by the control board 94. Some examples of the device 10 may always be in the on state, so that the condition of the turntable is always known to the device 10. Some examples of the device 10 may be configured to supply power to the turntable 12 upon the tonearm 18 being moved from its rest position, and to deactivate power to the turntable 12 upon the tonearm 18 being returned to its rest position.

Some examples of the control board 94 may also include provisions for remote control of the device 10, and/or the use of externally stored information in controlling the device 10, as explained in greater detail below. In the illustrated example, a Bluetooth interface 142 may be utilized to communicate with either a smart phone that has been provided with appropriate software, commonly known as an application or "app," or with a computer. Communication with a computer may also take place through a Wi-Fi interface 146. Either a computer 147 or smart phone 149 with appropriate software may communicate with an Internet database 148 containing information about various record albums. Information from the Internet database, as well as locally generated information which is generated as described below, may also be stored in a local database.

FIGS. 12-16 illustrate the steps performed by the device 10 during initialization, determining the location of track starting points on a record, and playing user-selected tracks. Beginning with FIG. 16, when power is turned on at step 150, the motor 66 is activated to drive the carriage 68 towards the limit switch 86, and so the limit switch 86 is contacted, at step 152. At this point, the location of the carriage 68 along the drive screw 62 is known, and will remain down through tracking the degree of movement of the motor 66. Similarly, at step 154, the motor 70 is actuated to lower the piston 72 until the limit switch 88 is contacted. At this point, the location of the piston 72 is known, and future movement of the position can be tracked by tracking the degree of movement of the motor 66. At step 156, the process enters the tracking mode depicted in FIG. 12.

Tracking mode is entered at step 158, at which point the system determines the next desired step. If, for example, a queue command is detected at step 160, then the system is directed towards the queuing mode subroutine a FIG. 14 at step 162. Otherwise, the system proceeds to step 164 to determine whether calibration is needed or desired. If so, then the system is directed to the calibration subroutine of FIG. 15 at step 166. Calibration mode begins at step 168 by inquiring of the user whether the base unit 42 is mounted in the orientation of FIGS. 1-2 (standard mounting) or the orientation of FIGS. 3-4 (reverse mounting). The mounting orientation determines which end of the range of motion of the carriage 68 corresponds to the rest position of the tonearm 18, and which end of the range of motion of the carriage 68 corresponds to the center most position of the tonearm 18 with respect to a record on the turntable 16. Once the position of the base unit 42 is determined, the position of the motors 66, 70 that corresponds to the rest position of the tonearm 18 can be determined at step 170. Next, the position of the motors 66, 70 corresponding to the location of the lead-in groove of a 12 inch record is determined at step 172. The motor positions corresponding to the record surface height at the end of the record is next determined at step 174. Lastly, the end of the lead out groove position is determined at step 176, and the system returns to the tracking algorithm at step 178.

Subsequent operation of the device 10 relies on determining the position of the slot 32 within the blade 24, and maintaining the piston 72 in position underneath the slot 32. The system checks to see whether the position of the tonearm 18 is known at step 178. If not, the motor 66 is activated at step 180 to move the carriage 68 along the drive screw 62 until the light sensor 92 detects light from the light source 90 being reflected from the reflective strip 36 of the blade 24, at step 182. At this point, the piston 72 is positioned underneath the slot 32. The system returns to step 158, at which point the motor 66 is activated as necessary to maintain the position of the piston 72 underneath the slot 32 of the blade 24, with the light sensor 92 providing a signal based on whether or not the carriage 68 is properly positioned. Since the direction of movement of the tonearm 18 while playing a record is known, the direction with which motor 66 must be turned to maintain the position of the carriage 68 with the tonearm 18 is also known. Since the piston 72 is thereby maintained underneath the slot 32 of the blade 24, the piston 72 may be raised to engage the tonearm 18 and move the tone arm 18 to a desired position at any time, as described in greater detail below.

Some examples of the device 10 may include a means for detecting and correcting any positioning errors between the piston 72 and slot 32. The light sensor 72 can continue to monitor reflected light from the reflective strip 34 as the piston 72 is engaged with the slot 32. If positioning errors are detected, the system can make adjustments by utilizing the change in the amount of light received by the light sensor 92 to determine the change in the relative position of the piston 72 and slot 32 that occurred when the piston 72 engaged the slot 32. This positional change can then be factored into subsequent monitoring of the position of the reflective strip 34 with respect to the light sensor 92.

Figure 13:
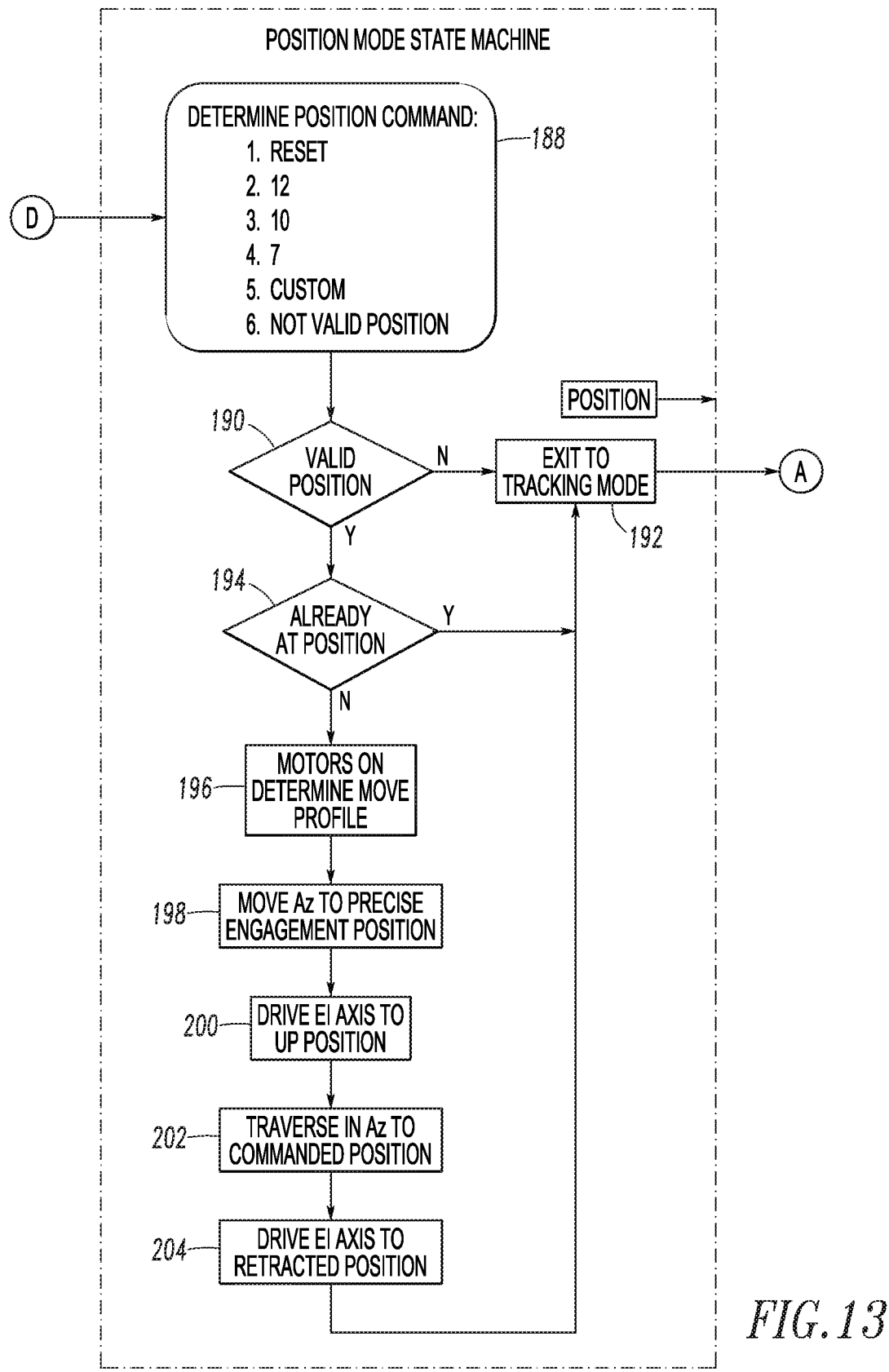
FIG. 13 is a flowchart showing a positioning operation for the manual to automatic record player conversion device of FIG. 1.

If a command to position the tonearm 18 at a given location is received at step 184, then the system will enter the subroutine for positioning the tonearm at step 186. The subroutine is illustrated in FIG. 13. Initially, the specific position command is identified at step 188. Possible position commands could be to move the tone arm 18 to the rest position, to the starting point of a 12 inch record, a 10 inch record, or a 7 inch record, or to move the tonearm 18 to another specified position on the record, most likely corresponding to the starting point of a desired song. If the position commands it is an invalid position, the system returns to the tracking mode at step 192. If the position entered is determined to be a valid position at step 190, the system next checks to see if the tonearm 18 is already in a desired position at step 194. If so, then the system returns to tracking mode at step 192. If not, then the motors are activated in the desired movement direction determined at step 196. The motor 66 is driven to place the piston 72 precisely under the slot 32 at step 198, and the motor 70 is activated to raise the piston at step 200. Once the piston 72 is engage the blade 24, the motor 66 is activated to move the tone arm 18 to the desired position at step 202. At this point, the motor 70 is activated to lower the piston 72, thus lowering the tonearm 18 into contact with the desired location at step 204. With the movement completed, the system returns to the tracking mode from step 192.

Figure 14:
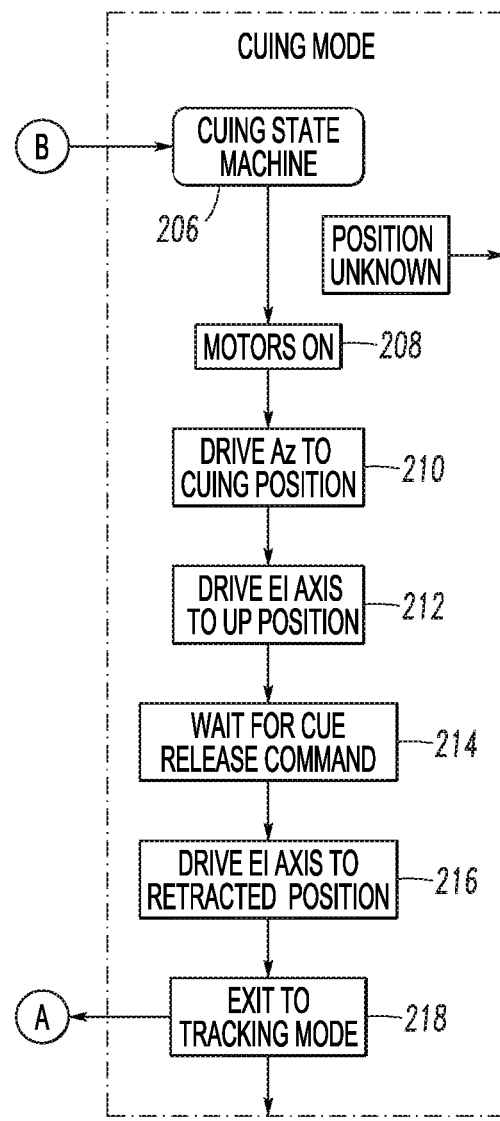
FIG. 14 is a flowchart showing a cueing operation for the manual to automatic record player conversion device of FIG. 1.
Figure 15:
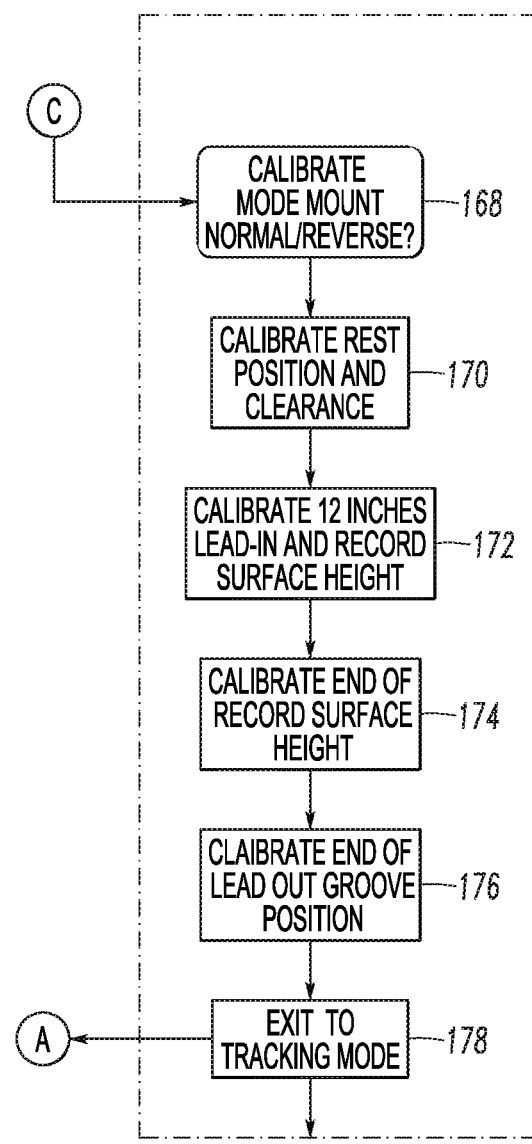
FIG. 15 is a flowchart showing a calibration operation for the manual to automatic record player conversion device of FIG. 1.
Figure 16:
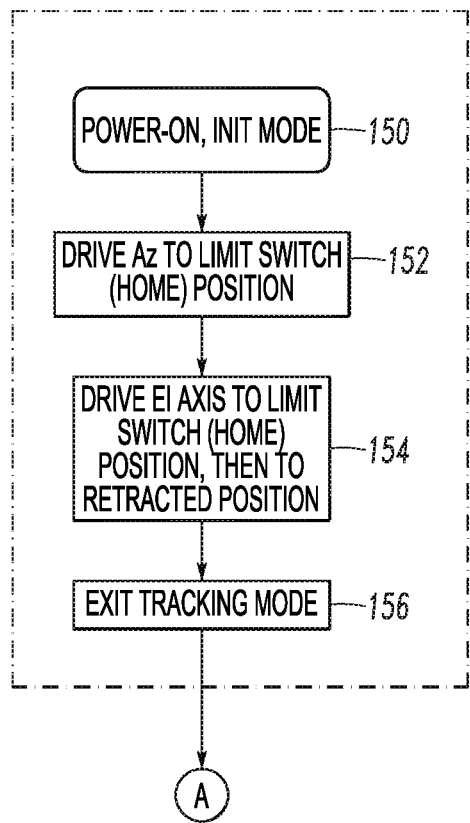
FIG. 16 is a flowchart showing an initialization operation for the manual to automatic record player conversion device of FIG. 1.

Movement of the tonearm 18 can also be accomplished through cuing, with an example queuing subroutine illustrated in FIG. 14. The cuing subroutine is entered at step 206. The motors 66, 70 are engaged at step 208 in preparation to move the tonearm 18. The motor 66 is activated to drive the carriage 68 to the appropriate position under the blade 24 at step 210. The piston 72 is raised at step 212 to engage the blade 24 along a flat portion of the blade 24, permitting the piston 72 to slide relative to the blade 24 as the tonearm 18 is manually moved into the desired position. The piston is lowered at step 216, and tracking mode is reentered at step 218. As another option, movement of the tonearm to the beginning of a 12", 10", or 7" record can be accomplished by pressing either the 12, 10, or 7 button.

Referring back to FIG. 12, whether the lead-out groove of a record has been reached is checked at step 179. If the lead out groove has been reached, then the system enters the rest position as the command position at step 181, and proceeds to the subroutine of FIG. 13 to execute the positioning sequence returning the tonearm 18 to the rest position. The system proceeds to step 183, where the system checks to see if the tonearm is in the rest position. If so, then at step 185, the motors 66, 70 are deactivated and the turntable off command is sent to plug unit 138 while the system awaits the next action. If not, then the motors remain on at step 187, and the system continues to track the tone arm while continuing to await other commands.

The first time a given record is played utilizing the device 10, the locations of the starting points of each song on the record can be determined for future use. After the system is powered on, calibrated is necessary, and begins playing the record, the positions of the tonearm 18, as indicated by the degree of movements of the motor 66, can be recorded in different ways. In some examples, the user may activate a control input such as a button or touch screen icon when the end of each song is reached, thus recording the location of the end of each song. In other examples, because the position of the tonearm 18 is being tracked by rotation of the motor 66 to maintain the position of the carriage 68 underneath the blade 24, the system can be configured to detect the wider grooves in the record, and resulting greater degree of tonearm 18 movements within these grooves, thus recording the location of the end of each song on the record. Once these locations are known, they can be saved for future use, or optionally uploaded into an Internet database for use by others. Because the location of the lead out groove was determined during calibration, the device 10 can be programmed to raise the tone arm 18, and to move the tone arm 18 to the rest position, once the lead out groove has been reached.

Once the starting positions for each song on a record are known, the device 10 can be programmed to play some or all of the songs on the record in a user determined sequence. At the end of each song, the system will raise the tonearm 18, move the tone arm 18 to the starting point of the next song, and lower the tonearm 18 as described above, using the positioning subroutine of FIG. 13. Once the complete list of preselected songs has been played, the device 10 may move the tonearm 18 to its rest position. Pressing the stop button at any time will also cause the tonearm 18 to return to its rest position.

Figure 11:
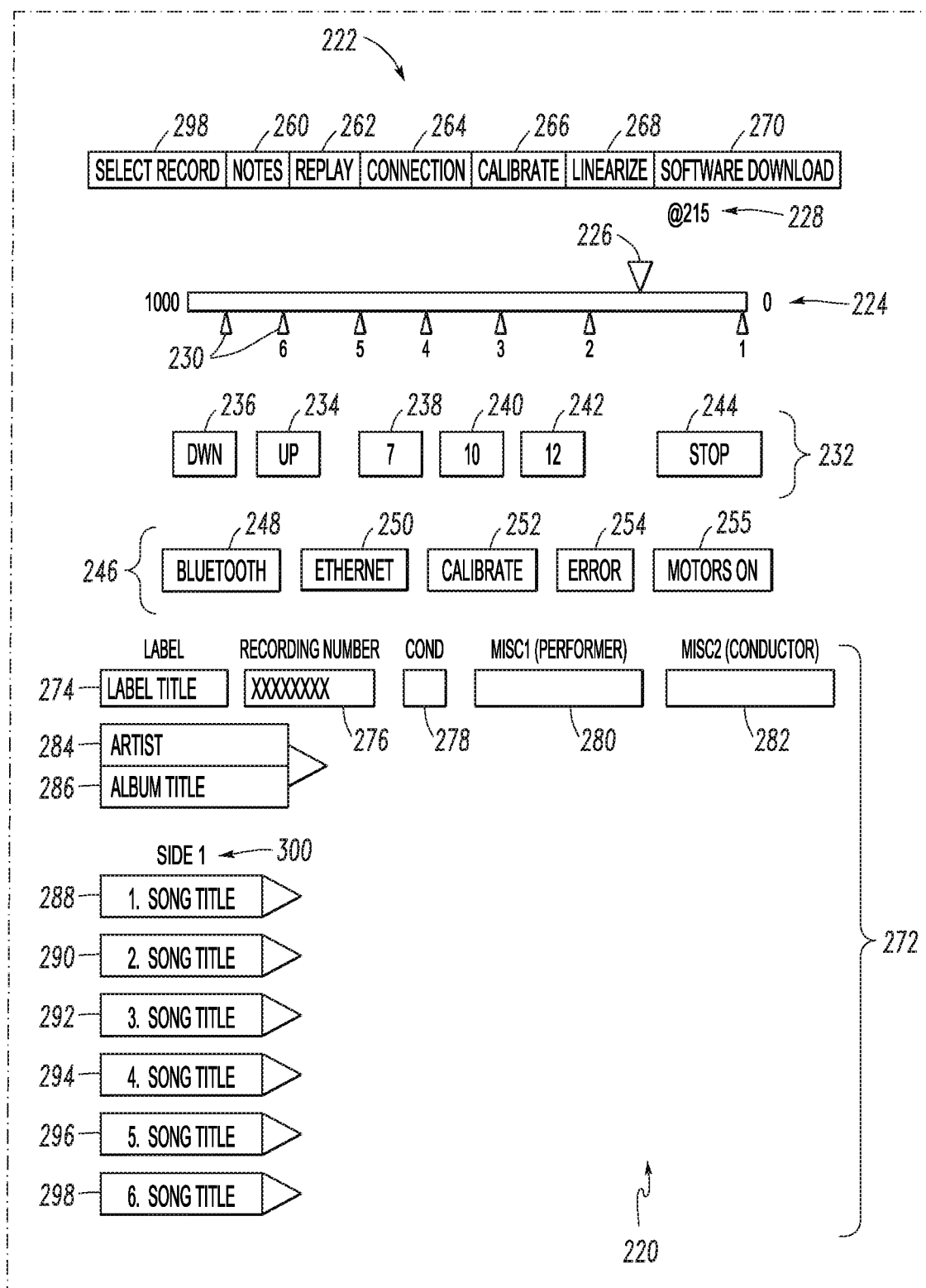
FIG. 11 is a diagram of a control display screen for controlling the manual to automatic record player conversion device of FIG. 1.
Figure 12:
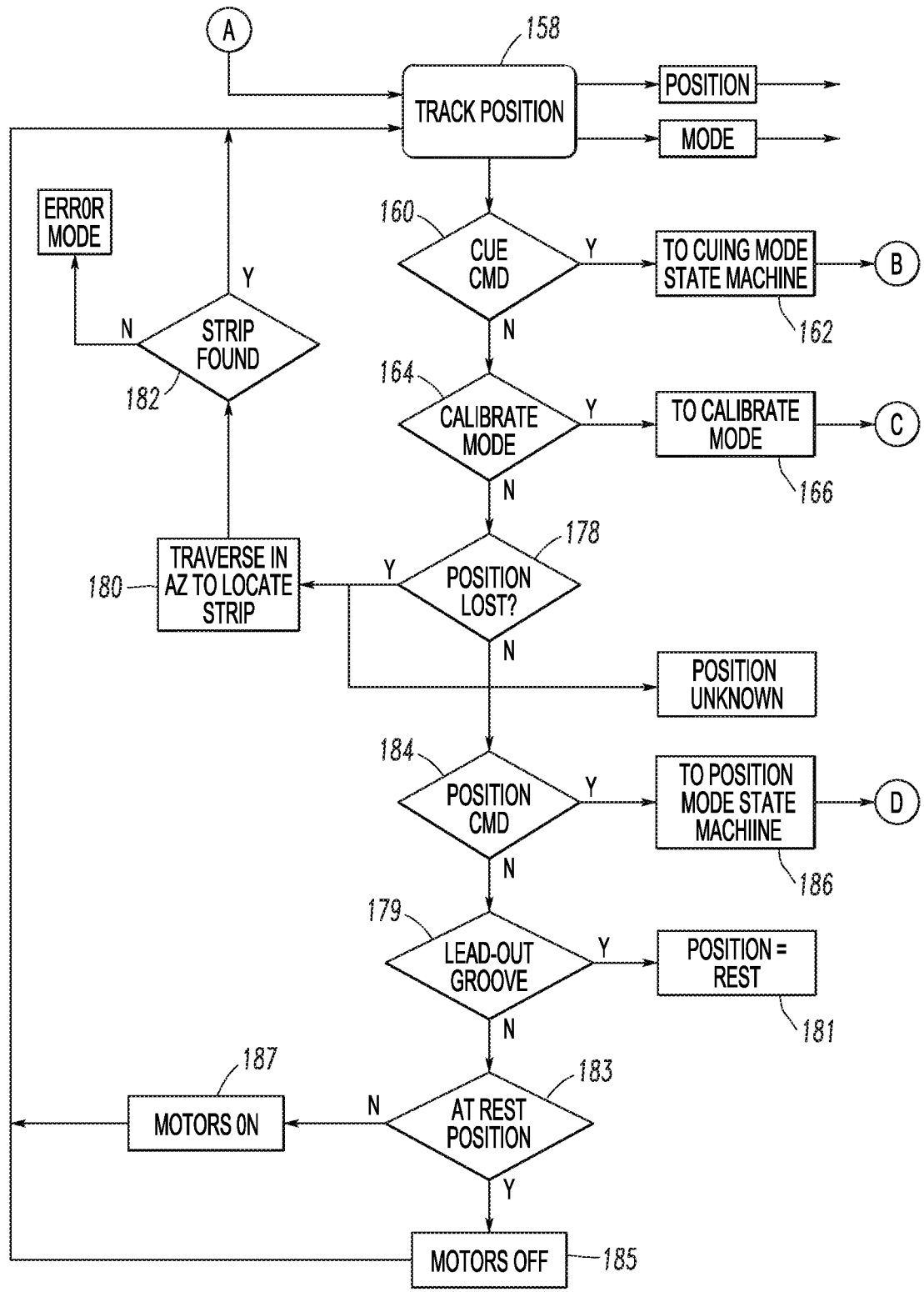
FIG. 12 is a flowchart showing a tracking operation for the manual to automatic record player conversion device of FIG. 1.

Referring to FIG. 11, an example of a control screen 220 that can be displayed on the screen of a personal computer, a tablet computer, or a smart phone is illustrated. Depending upon the computer or smart phone with which the software for the device 10 is used, items displayed on the control screen 220 could be selected using a touch screen, a mouse, or any other conventional user interface. The specific items displayed on a control screen 220 may also vary by type of computer. For example, the items displayed on the illustrated example of the control screen 220 may be broken into several screens for use with a smaller smart phone screen. The illustrated example of the control screen 220 includes a menu bar 222, which in the illustrated example is displayed across the top of the control screen 220. A tone arm position bar 224 is displayed in the illustrated example below the menu bar 222. In the illustrated example, the tonearm position bar 224 includes a tone arm position stylist 226 as well as a digital tonearm position indicator 228. The tonearm position stylist 226 and position indicator 228 in the illustrated example display a tonearm position which is denoted between the rest position of zero and the lead out groove position of 1000. If the tonearm 18 is elevated, the tonearm position stylist 226 will also be displayed elevated from the tonearm position bar 224. The illustrated example of the tonearm position bar 224 also includes song beginning indicators 230 displayed below the tonearm indicator bar 224.

The illustrated example of the control screen 220 includes manual control buttons 232, which in the illustrated example are disposed below the tonearm position indicator bar 224. In the illustrated example, the manual control buttons include up and down buttons 234, 236, respectively, for raising and lowering the tonearm 18. Buttons 238, 240, 242 are each used to initiate playing a 7 inch, 10 inch, or 12 inch record, respectively. The stop button 244 may be used to stop play and return the tonearm 18 to its rest position.

The illustrated example of the control screen 220 includes various status indicators 246. In the illustrated example, the status indicators include a Bluetooth indicator 248 for indicating a Bluetooth connection to the device 10, and ethernet indicator 250 indicating an ethernet connection to the device 10, a calibrate indicator 252 indicating when calibration is taking place, in error indicator 254 indicating when an error has occurred, and a motors on indicator 255 indicating that the motors are ready to move the tonearm 18 and that the turntable power is on.

In the illustrated example, the menu bar 222 includes a select record icon 258 a notes icon 260 a replay icon 262, a connection icon 264, a calibrate icon 266, a linear rise icon 268, and a software download icon 270. In the illustrated example, the select record icon 258 is used to access submenus to select record entries in the local database, to change data within a selection with a local database, to delete a record within the local database, or to enter data for a new record that is not yet within the local database. An example of data 272 for a record is illustrated in a lower portion of the control screen 220. In the illustrated example, the data includes a label 274, a recording number 276 a condition field 278 and a pair of miscellaneous fields 280, 282. In the illustrated example, the condition is displayed as a numerical value which in the illustrated example is between one and five. The artist 284 and album title 286 are also displayed. Lastly, the songs 288, 290, 292, 294, 296, and 298 for the selected album side 300 are displayed. This information can be newly added, edited, or deleted using appropriate menu icons.

To enter information for a new record, a "new album" selection may be chosen from the select record submenu. After completing the information in the various data fields, the record is played. As the tonearm 18 encounters the grooves separating the individual songs, the increased movement of the tonearm is detected as described above, with the location of the start of each song being recorded as it is encountered by the tonearm 18. The process can then be repeated for the other side of the record. When complete information is entered for a given record, that information can be uploaded into an Internet database that is accessible to other users of other devices 10.

When playing a record for which all data has already been recorded, is no longer necessary to play the record from start to finish, or to manually move the tonearm 18 to the start of desired songs. In the illustrated example, the replay icon 262 is utilized to bring up the submenu permitting the user to enter a desired sequence of songs, and then to play the desired song sequence. As one example, selecting a song may open a dialog box permitting the user to enter the number in the sequence in which that songs to be played, as well as the number of times the side or song is to be repeated.

The connection icon 264 can be utilized to connect to the device 10. The installed app on a computer, tablet, or smart phone can make connection to the unit over Bluetooth or IP (ethernet, or Wi-Fi).

The calibrate menu icon 266 is used to calibrate the device 10 as described above.

Figure 18:
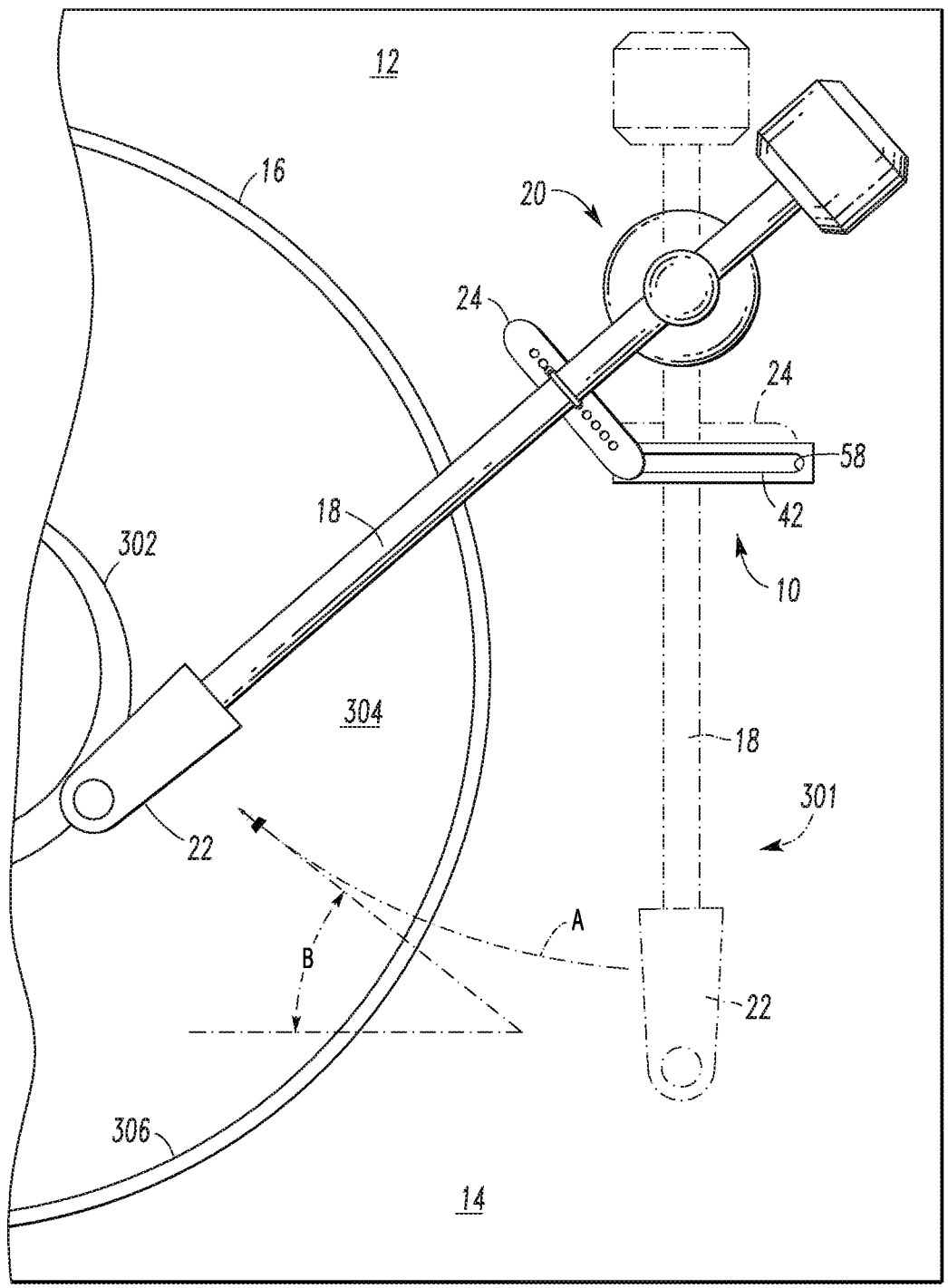
FIG. 18 is a top plan view of a manual record player having a manual to automatic record player conversion device, showing a first mounting orientation, and illustrating the changing angle of movement of the tonearm with respect to the conversion device.

The linearize menu icon 268 is used following calibration, in order to compensate for different possible positioning of the base unit 42 of the device 10 on the turntable housing 14. Although the piston 72 moves linearly in a horizontal direction, the tonearm 18 that is ultimately moved by the piston 72 moves in an arc, as illustrated by the arrow A. Thus, in the example of standard mounting shown in FIG. 18, when the tonearm 18 is in its at rest position 301, the piston 72 is moving the tonearm 18 in a direction that is substantially parallel to the movement of the piston 72. However, when the tonearm 18 reaches the lead out groove 302 of the record 304, the movement of the tonearm 18 is now angled with respect to the direction in which the piston 72 moves horizontally. The angle between the direction of piston 72 movement and tonearm 18 movement is illustrated by angle B. In order to move the tonearm 18 a given distance, the piston 72 will have to move a distance equal to the desired distance of tonearm 18 movement divided by the cosine of angle B. Expressed differently, for any position of the tonearm 18, the distance that the tonearm 18 will move when the piston 72 moves a given distance is equal to the distance traveled by the piston 72, multiplied by the cosine of the angle between the direction of piston 72 movements and the direction of tonearm 18 movement. Therefore, as the tonearm 18 is moved from the rest position 301 towards the lead out groove 302, the movement of the tonearm 18 will gradually decrease with respect to the movement of the piston 72.

Figure 19:
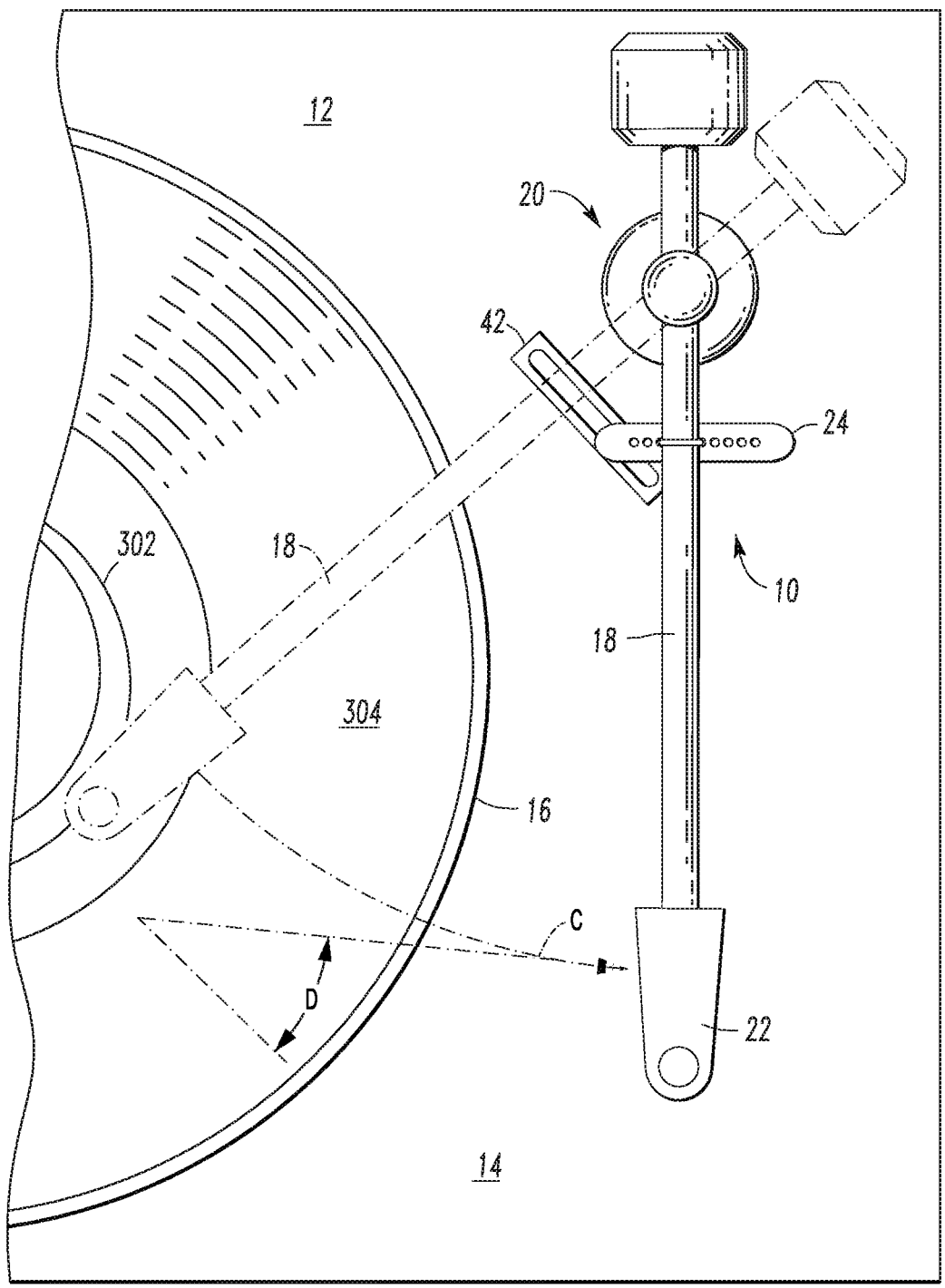
FIG. 19 is a top plan view of a manual record player having a manual to automatic record player conversion device, showing a second mounting orientation, and illustrating the changing angle of movement of the tonearm with respect to the conversion device.

The opposite situation exists in the case of reverse mounting as illustrated in FIG. 19. The tonearm is moving in the arc shown by the arrow C. When the tonearm 18 is at the lead out groove 302, the piston 72 is moving the tonearm 18 in a direction that is substantially parallel to the movement of the piston 72. However, when the tonearm 18 reaches its rest position 301, the movement of the tonearm 18 is now angled with respect to the direction in which the piston 72 moves horizontally. The angle between the direction of piston 72 movements and tonearm 18 movement is illustrated by angle D. In order to move the tonearm 18 a given distance, the piston 72 will have to move a distance equal to the desired distance of tonearm 18 movement divided by the cosine of angle D. Expressed differently, for any position of the tonearm 18, the distance that the tonearm 18 will move when the piston 72 moves a given distance is equal to the distance traveled by the piston 72, multiplied by the cosine of the angle between the direction of piston 72 movement and the direction of tonearm 18 movement. Therefore, as the tonearm 18 is moved from the lead out groove 302 towards its rest position 301, the movement of the tonearm 18 will gradually decrease with respect to the movement of the piston 72.

Because the tonearm position is recorded by tracking the position of the motor 66 as it moves the piston 72 horizontally, accurately recording the starting position of each song on a given record in a manner that can be uploaded into the Internet database and/or used with a different device 10, it is necessary to linearize the arced movement of the tonearm 18. While linearizing the movement, it is helpful but not necessary to know whether the base unit 42 is mounted in a standard or reverse configuration. As the tonearm 18 is moved from its rest position 301 to the position of the lead out groove 302 on a record, not only is the movement of the motor 66 recorded, but this movement is multiplied by the cosine of the angle between the direction of piston 72 movement and the direction of tonearm 18 movement at each point for which movement is recorded. With this information known, the quantity with which to multiply each position on a record at which a beginning of the song is recorded in order to record that position in terms of a tonearm 18 position rather than a motor 66 position is known. Additionally, the quantity by which to divide each tonearm 18 position in the database in order to convert that tonearm 18 movement into a motor 66 movement is also known. Linearization therefore permits the data of a record to be recorded using one of either a standard or reverse mounted base unit 42, and then utilizing the data with either of a standard or reverse mounted housing 42. Some examples of Internet database is utilized with the device 10 may only permit uploading data to the database if the device 10 from which data is uploaded has first been linearized.

In addition to the differences between standard and reverse mounting, it is unlikely that most users would mount the base unit 42 exactly perpendicular to the tonearm 18 at a beginning or ending point of the movement of the tonearm 18. Some deviation from perpendicular must be anticipated. Once the calibration procedure has been completed, the position of the tonearm 18 corresponding to various locations along the path of the tonearm 18 have been determined by that procedure. With these positions known (rest position 301, lead-in groove 306, lead out groove 302), the relative time required to reach each position, and/or the travel distance of the piston 72 between each position can be compared to the typical tone arm 18 travel distance between each pair of positions. A longer travel of the piston 72 between a pair of positions means that the angle between piston 72 movement and tonearm 18 movement is greater. A shorter travel of the piston 72 between a pair of positions means that the angle between piston 72 movement and tonearm 18 movement is smaller. Knowing that the arc of the tonearm 18 movement will be a portion of a circle, a curve representing the movement of the tonearm 18 can be generated based on the data derived from linearization process. This curve can be represented as a mathematical function relating horizontal movement of the piston 72 to the arced movement of the tonearm 18. Once this curve is known, then the direction of travel of the tonearm 18 at any point along this curve is known. In addition to the mathematical function describing the curve, with this information, the cosine of the angle between the drive screw 62 and the direction of travel of the tonearm 18 can be calculated at any point along the curve. When the app records the starting points of each song on a record, this information can then be used as described above to linearize those starting points. When linearized data is downloaded from the Internet through the app to the device 10, the information can be similarly converted for use on a specific device 10 and record player 12.

The last menu icon in the illustrated example of the menu bar 222 is the software download icon 270. In the illustrated example, this icon causes a software installation submenu to be displayed, permitting the user to download, update, and install the software necessary to operate the device 10.

Figure 20:
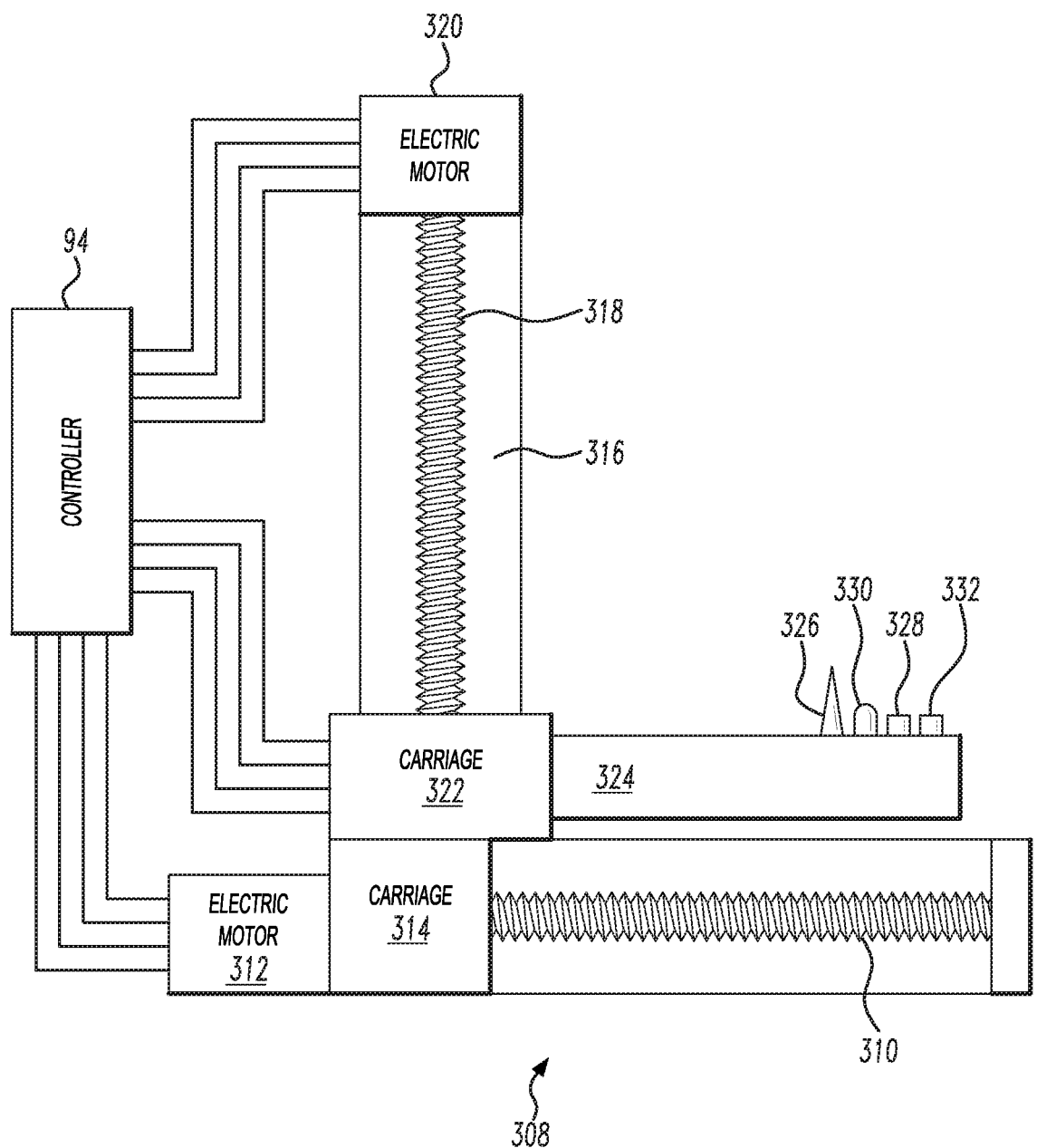
FIG. 20 is a side elevational view of an alternative base unit for a manual to automatic record player conversion device.
Figure 21:
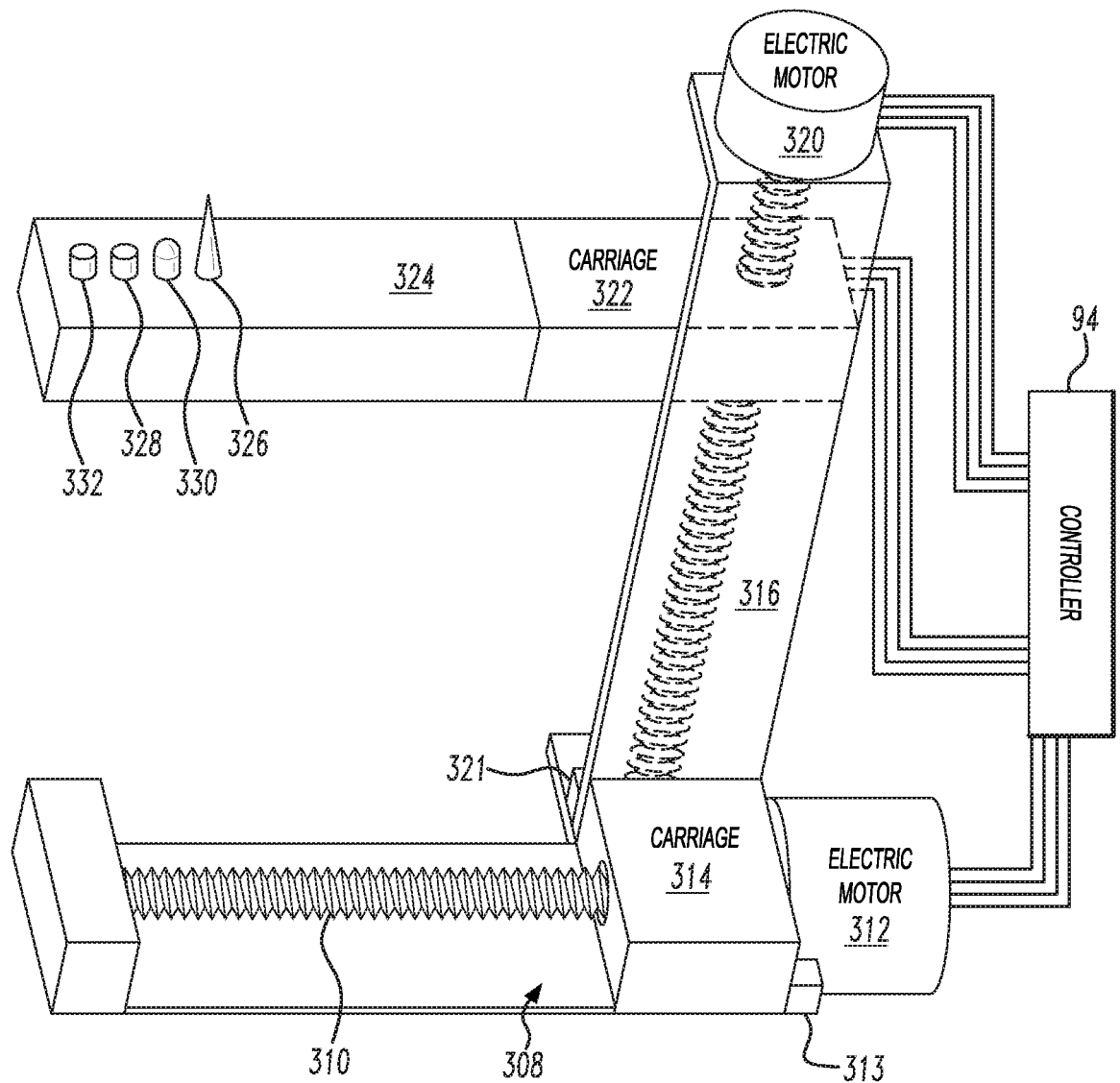
FIG. 21 is a perspective view of the base unit of FIG. 20.

Referring to FIGS. 20-21, an alternative base unit 308 is illustrated. The base unit 308 is similar to the base unit 42. In the illustrated example, the control board 94 is contained within a separate housing from the base unit 42, thus providing more flexibility in locating the base unit 42. The illustrated example of the base unit 308 includes a threaded horizontal drive shaft 310 that is rotated by the motor 312. A carriage 314 is secured to the threaded shaft 310 so that rotation of the shaft 310 moves the carriage 314 along the shaft 310. A tower 316 extends upward from carriage 314. The tower 316 includes a threaded vertical shaft 318 that is rotated by the motor 320, which in the illustrated example is disposed at the top of the tower 316. A carriage 322 is secured to the threaded shaft 318 so that rotation of the shaft 318 raises or lowers the carriage 322. The illustrated examples of the motors 312, 320 are stepper motors which are capable of being driven by a calibrated stepper motor drive system that provides positional feedback based on an initial position of the stepper motor and degree of rotation from that initial position. The drive system for the illustrated examples of the stepper motors 312, 320, which is not described in detail herein because stepper motor drive systems are well known to those skilled in the art, includes to output drivers, with each driver having reversing polarity. Limit switches 313, 321, for the carriages 314, 322, respectively, detect when each carriage 314, 322 has reached its respective limit switch 313, 321, thus providing a starting point for positional tracking using the stepper motors 312, 320. An arm 324 extends substantially horizontally from the carriage 322. The arm 324 holds an upwardly projecting stylus 326 for engaging the slot 32 of the blade 24. The arm 324 also includes an LED 328, a reflected light sensor 330 which in the illustrated example is disposed between the LED 328 and stylus 326, and an ambient light sensor 332, which in the illustrated example is disposed adjacent to the LED 328, but on the opposite side of the LED 328 as the reflected light sensor 330.

Figure 22:
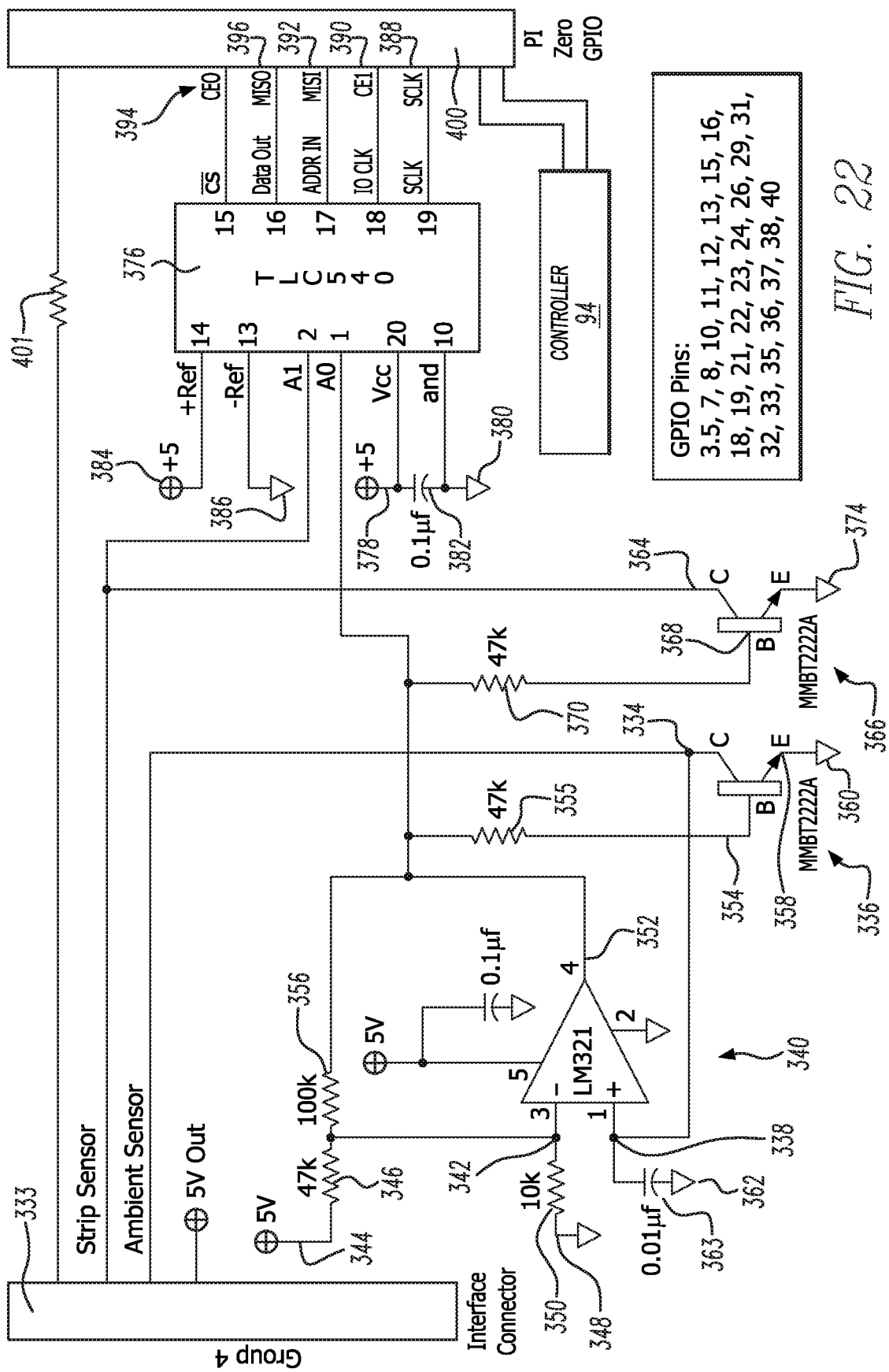
FIG. 22 is a schematic diagram of an electrical circuit for use within a control system for a manual to automatic record player conversion device.

The purpose of the ambient light sensor 332 is to provide a reference ambient light level which can be compared to the amount of light received by the reflected light sensor 332, thus ensuring that the device 10 can more accurately determine whether the stylus 326 is underneath the slot 32 in a variety of lighting conditions. Referring to FIG. 22, the voltage received from the reflected light sensor 330 is modified based on the voltage received from the ambient light sensor 332. Although specific values are given for the various components described in the example below, these values are only one example, and may change without departing from the scope of the invention. To best understand how the voltage signal from the light sensors fluctuates under different conditions, it should be understood that the light sensors are resistive devices to which power is supplied by a constant current source, so as the resistance to the current varies, current will remain the same, but voltage will vary accordingly.

FIG. 22 illustrates the sensor signals being transmitted from an interface 333 which would be connected to the sensors 330, 332 as well as the LED 328. Power to the LED 328 is provided from the input/output interface 400 through the resistor 401. The signal from the ambient light sensor 332 is simultaneously provided to the collector 334 of the NPN transistor 336 as well as the non-inverting input 338 of the operational amplifier 340. In the illustrated example, the operational amplifier is a LM321 Low Power Single Operational Amplifier made by Texas Instruments, and the transistor is a MMBT222A NPN switching transistor made by Nexperia. The inverting input 342 of the operational amplifier 340 is connected to a 5 v voltage source 344 through a 47 kΩ resistor 346, as well as to ground 348 through a 10 kΩ resistor 350, so that the two resistors act as a voltage divider for the 5 v voltage input. This results in 0.9 v. being input into the inverting input 342. The output 352 of the amplifier 340 is simultaneously provided to the base 354 of the transistor 336 through the 47 kΩ resistor 355, as well as providing feedback to the inverting input 342 through a 100 kΩ resistor 356. The emitter 358 of the transistor 336 is connected to ground 360. The non-inverting input 338 is also connected to ground 362 through a 0.01 µf capacitor 363, thus smoothing out any inconsistencies in the signal. Due to the feedback loop provided by operational amplifier 340 and transistor 336 the non-inverting input 338 is clamped to the same 0.9 v as the inverting input. Stated more specifically, when the resistance of ambient light sensor 332 is reduced by changing light conditions that change results in a voltage increase at both the collector 334 of transistor 336 and the non-inverting input 338 of operational amplifier 340. The high gain of operational amplifier 340 causes the output voltage 352 to rise sharply. The rise in voltage increases the current into base 354 of transistor 336. This causes the current into collector 334 of transistor 336 to also rise sharply. The resulting combination of high gain eliminates almost all the voltage rise at the non-inverting input of 338, and it stabilizes at approximately the same 0.9 volt level. But the net result is that the voltage across both resistor 355 and resistor 370 has been increased equally by the increased voltage at output 352. The current is therefore increased equally into both the base 354 of transistor 336 and the base 368 of transistor 366. Therefore, the current compensation applied into the collector 334 of transistor 336 is also made into collector 364 of transistor 366. This result of this relationship is further detailed below.

The voltage signal from the reflected light sensor 330 is provided to the collector 364 of the transistor 366. The voltage at the amplifier output 352 is provided to the base 368 of the transistor 366 through the 47 kΩ resistor 370. Thus, the voltage provided to the transistor base 354 and the transistor base 368 is identical. The emitter 372 of the transistor 366 is connected to ground 374. An increase in the voltage at the transistor base 368 causes the same current change into the collector 364 of the transistor 366 as collector 334 of transistor 336. Therefore the biasing of transistor 336 always remains identical to the biasing of transistor 366. The changes in bias to transistor 336 due to changing ambient light conditions will result in the same bias changes to transistor 366 negating the effects of ambient light changes in light sensor 330 readings. With the voltage signal from the reflected light sensor 330 so modified, this voltage signal as supplied to the microchip 376 will correlate to the increase in light received by the reflected light sensor when that sensor is under the reflective strip 36 of the blade 24, regardless of ambient light conditions, rather than simply the total light received at the light sensor 330.

In the illustrated example, the microchip 376 is a TLC540 8 bit analog to digital converter made by Texas Instruments. Those skilled in the art of electrical engineering will recognize that a 5 v power supply 378 is connected to the Vcc pin 20, and the ground pin 10 is connected to ground 380. In the illustrated example, a 0.1 µf capacitor 382 is connected between the power supply 378 and ground 380 in order to minimize any inconsistencies in the power supply. A 5 v power supply 384 is connected to the positive voltage reference pin 14, and the negative voltage reference pin 13 is connected to ground 386. A system clock input 388 is supplied to the system clock pin 19, and an input/output clock input 390 is supplied to the input/output clock pin 18. An address input 392 is supplied to the address input pin 17, so that any of the input pins A0 through A10 may be selected for processing. A chip select input 394 is connected to the chip select pin 15. Those skilled in the art will recognize that the microchip 376 is active when the chip select signal is low, and inactive when the chip select signal is high. The output 352 from the operational amplifier 340 is connected to input A0 pin 1, and the output of the reflected light sensor 330 is provided to input A1 pin 2. The resulting output 396 from the analog to digital conversion of either the output 352 from the operational amplifier 340 or the voltage signal from the reflected light sensor 330, whichever is selected by the address input, is provided at data output pin 16. In the illustrated example, the output 352 or the signal from the sensor 330 will be alternately selected. The signal from the data output pin 16 is then provided to the microcontroller 398.

One example of a suitable controller is a computer sold under the RASPBERRY PI trademark. In FIG. 22, a general purpose input/output connector 400 for a RASPBERRY PI is illustrated, providing the chip select input 394, address input 392, input/output clock input 390, and system clock input 388. Similarly, data output 396 from the analog to digital converter 396 is provided to the general purpose input/output connector 400, which is connected to the Raspberry PI or other microcontroller in a manner that is known to those familiar with microcontrollers. The RASPBERRY PI, or other microcontroller, may then be used to locate the tonearm from the modified, digitized signal of the light sensor 330.

Figure 23:
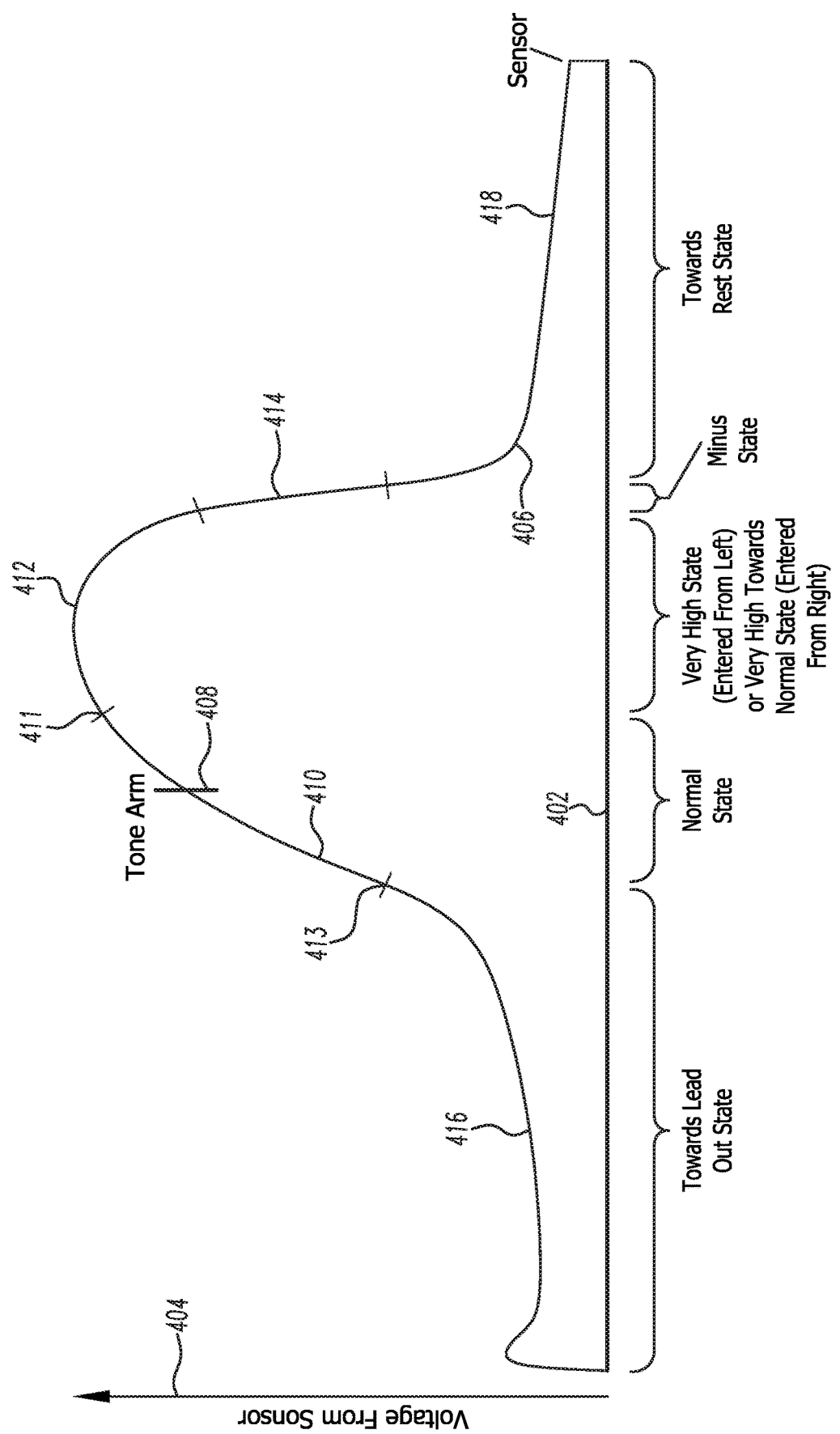
FIG. 23 is a graph illustrating the functioning of the manual to automatic record player conversion device during sensing and tracking of the position of the tonearm, showing the normal state.

Referring to FIGS. 23-27, a method of interpreting the modified, digitized signal from the light sensor 330 is illustrated. The graph of FIG. 23 shows the modified voltage from the reflected light sensor 330 as it passes under the tonearm 18. In order to maximize the accuracy and precision with which the tonearm 18 can be located, the illustrated example attempts to maintain the position of the stylus 326 based on the leading edge of the curve, corresponding to the trailing edge of the reflective strip on the blade 24 of the tonearm 18. Expressed differently, the system attempts to keep the reflected light sensor 330 slightly behind but still partially under the reflective strip 36. It would also be possible to utilize the top portion or trailing edge of the curve without departing from the scope of the invention, in a manner similar to the manner in which using the leading edge is described herein.

Figure 24:
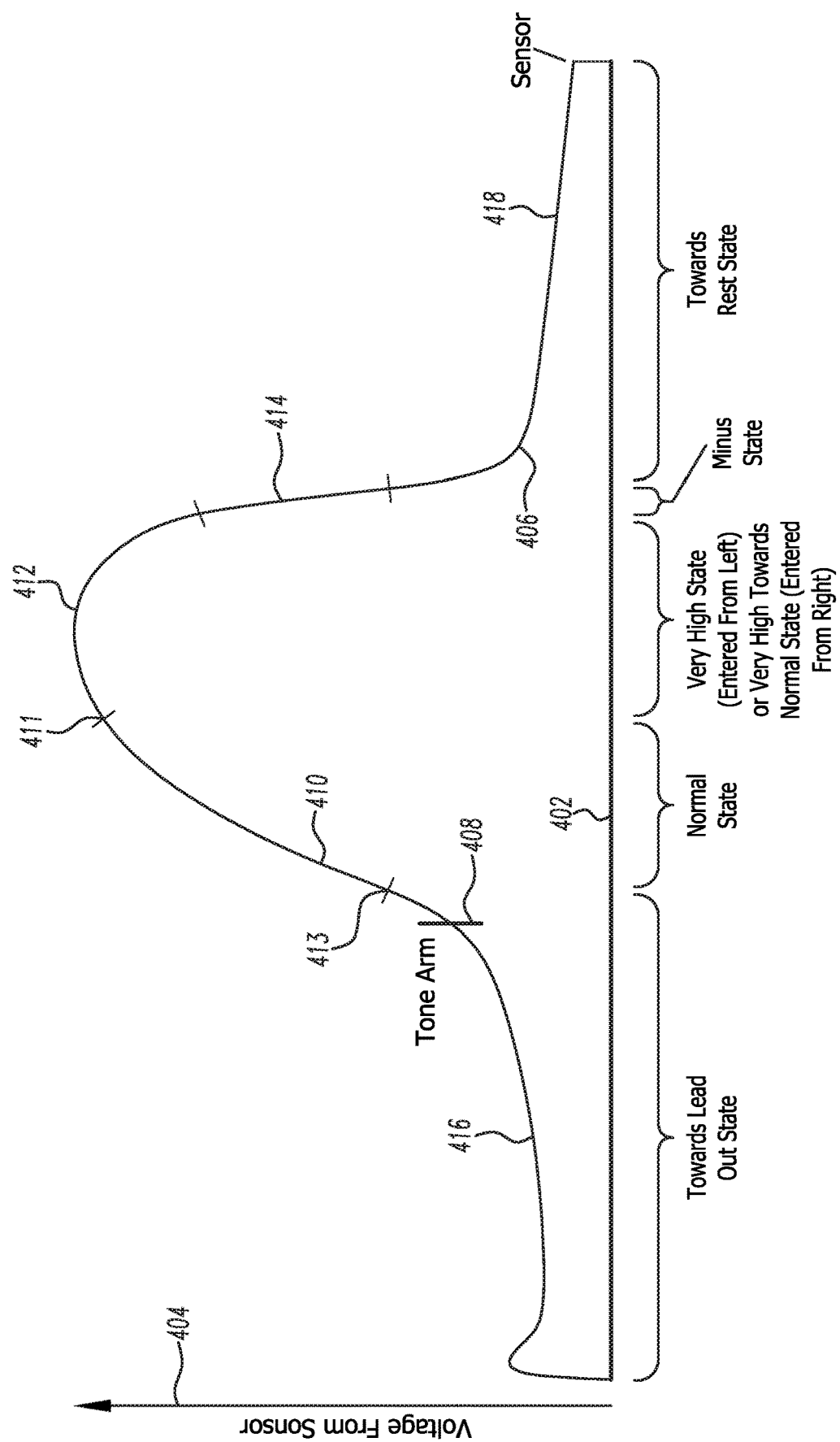
FIG. 24 is a graph illustrating the functioning of the manual to automatic record player conversion device during sensing and tracking of the position of the tonearm, showing the towards lead out state.
Figure 25:
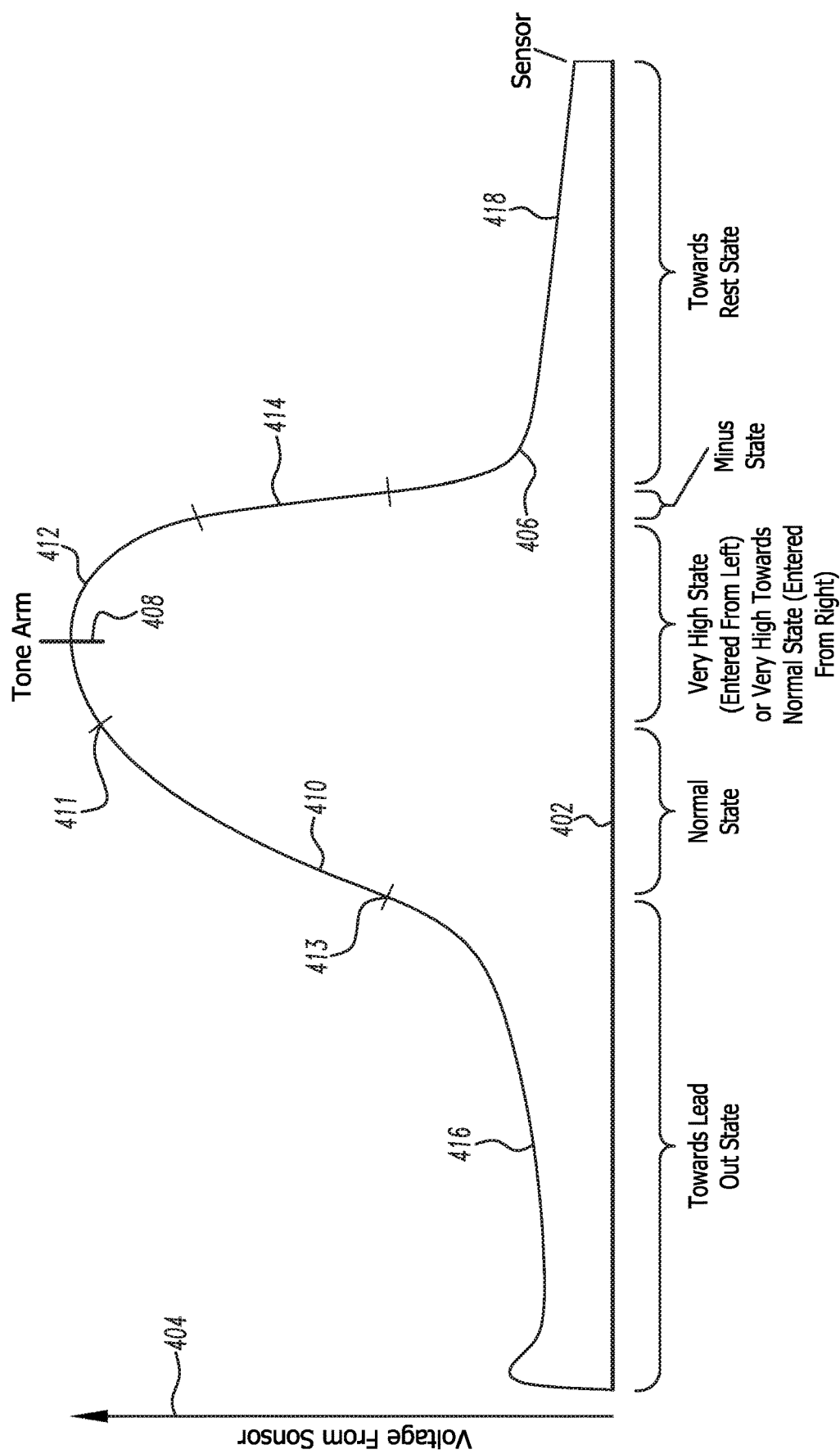
FIG. 25 is a graph illustrating the functioning of the manual to automatic record player conversion device during sensing and tracking of the position of the tonearm, showing either the very high state or the very high towards normal state.
Figure 26:
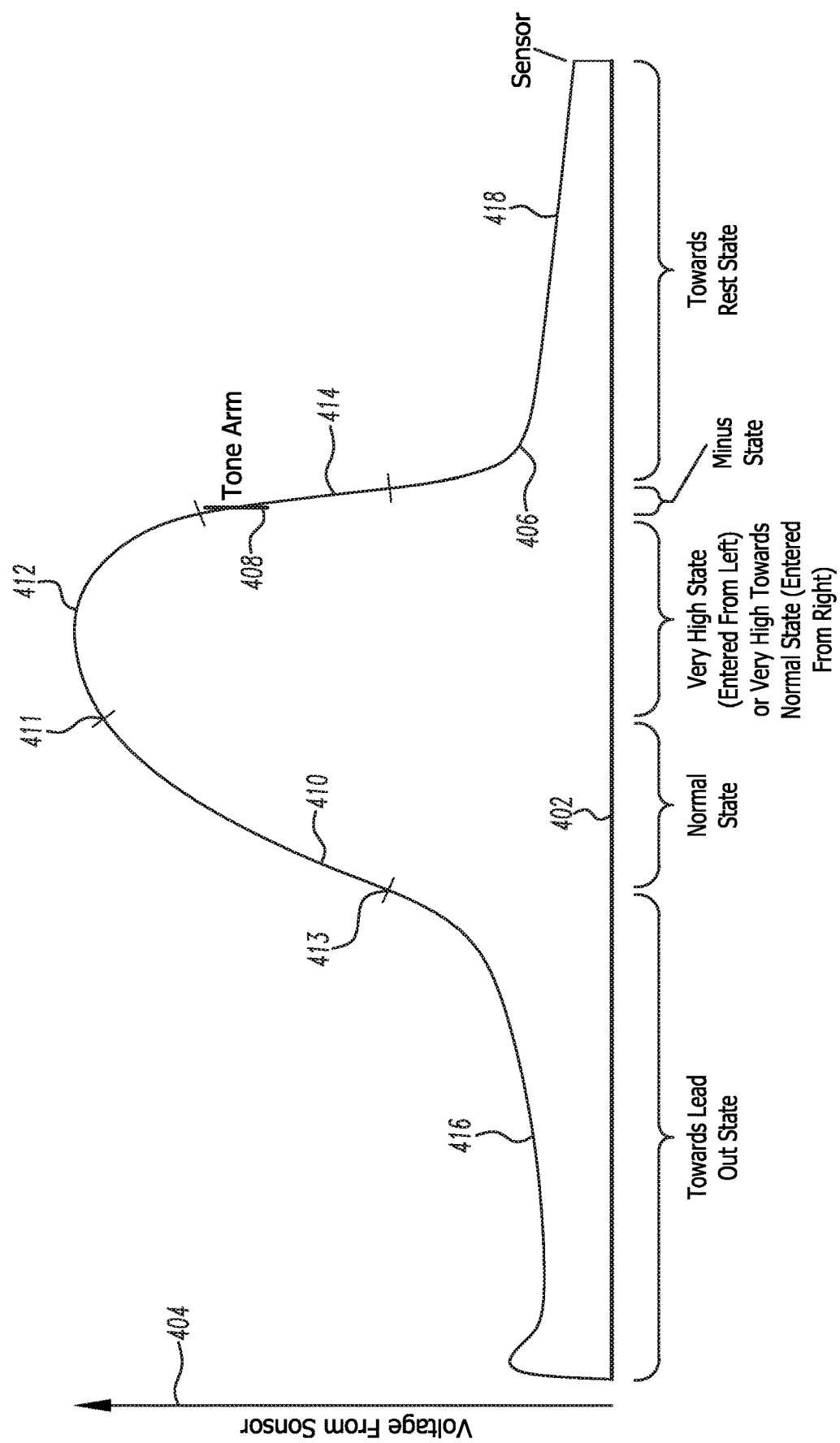
FIG. 26 is a graph illustrating the functioning of the manual to automatic record player conversion device during sensing and tracking of the position of the tonearm, showing the minus state.
Figure 27:
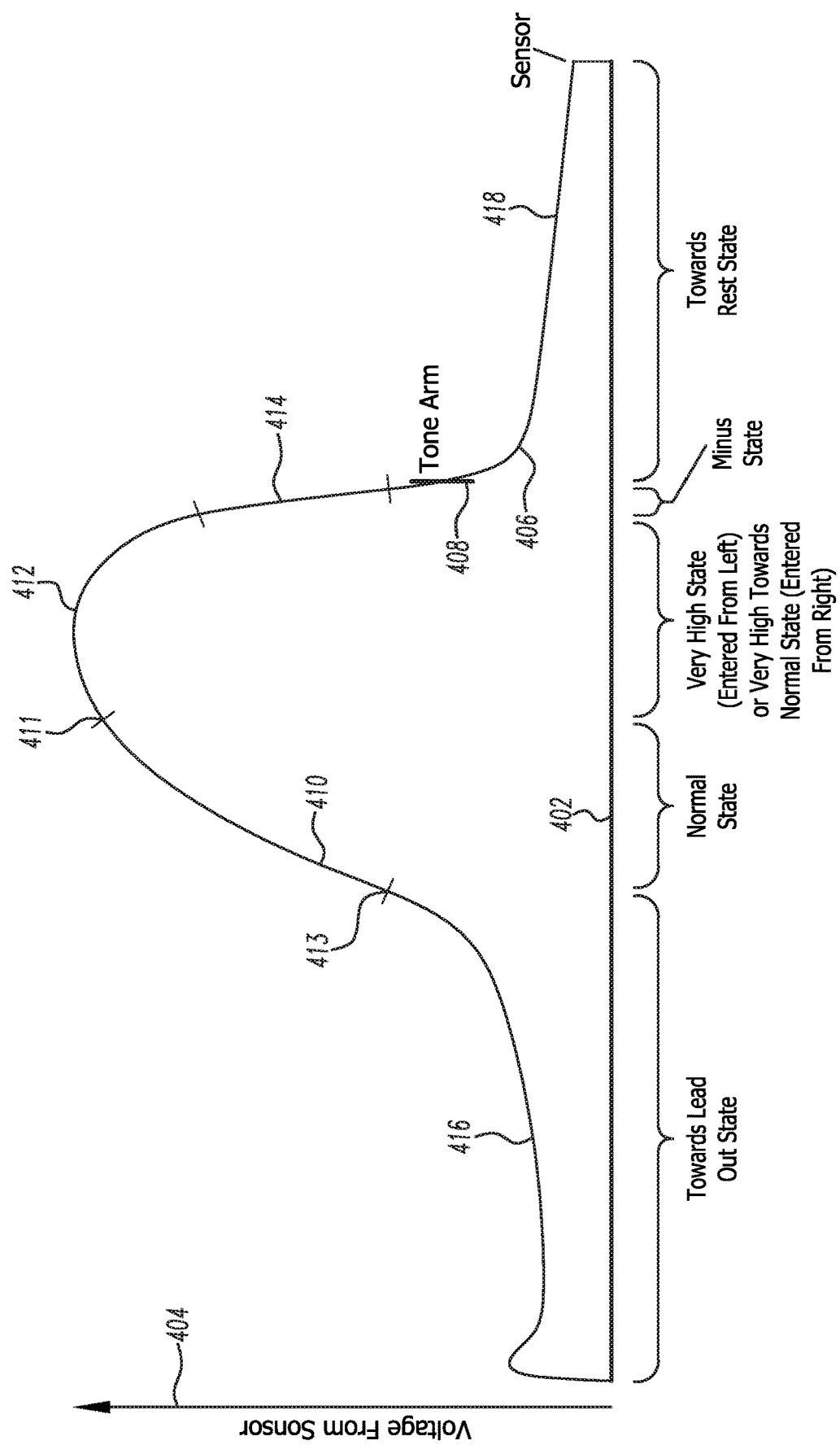
FIG. 27 is a graph illustrating the functioning of the manual to automatic record player conversion device during sensing and tracking of the position of the tonearm, showing the towards rest state.
Figure 28A:
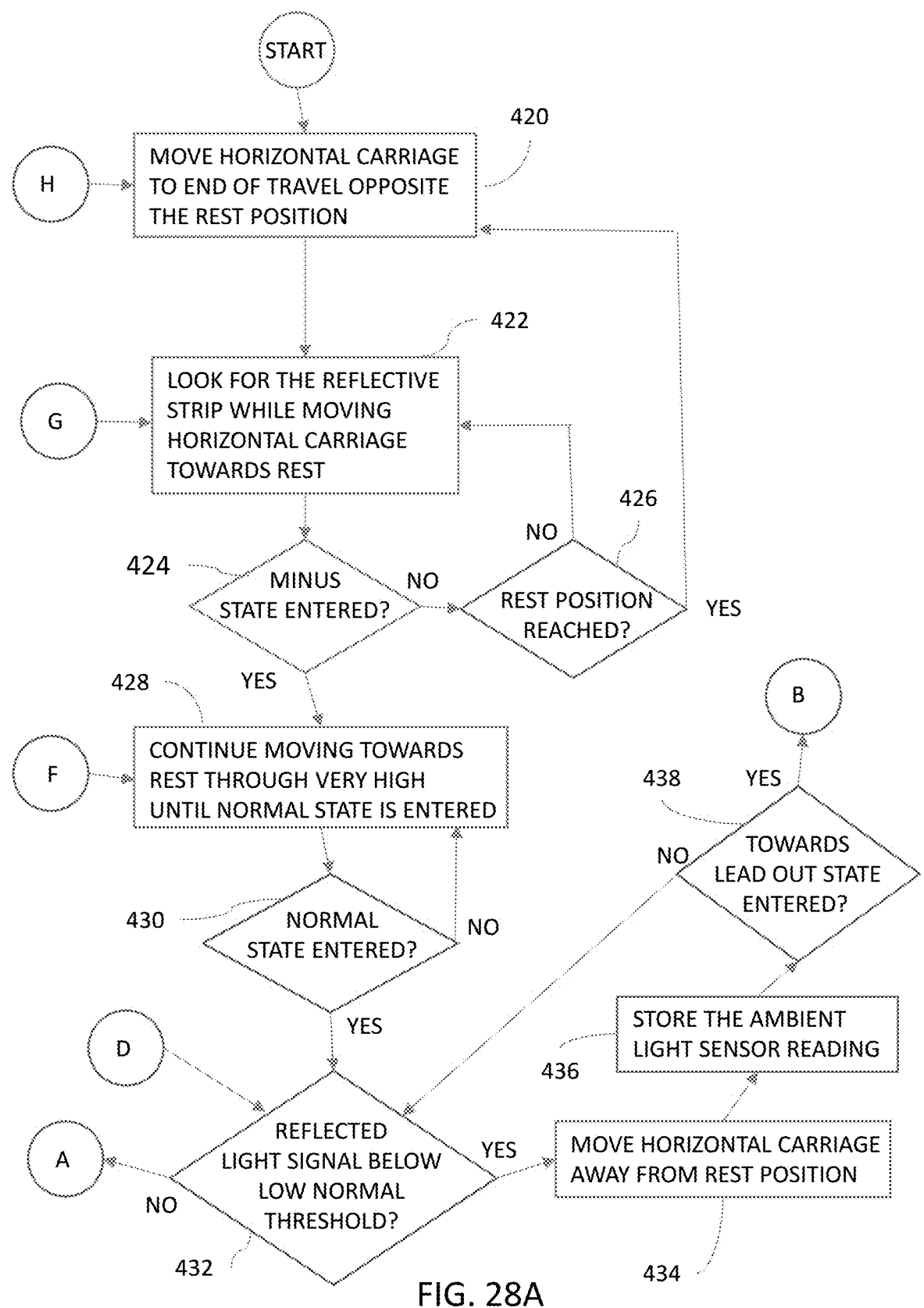
FIGS. 28A-28E are a flowchart showing a process for tracking a tonearm.
Figure 28B:
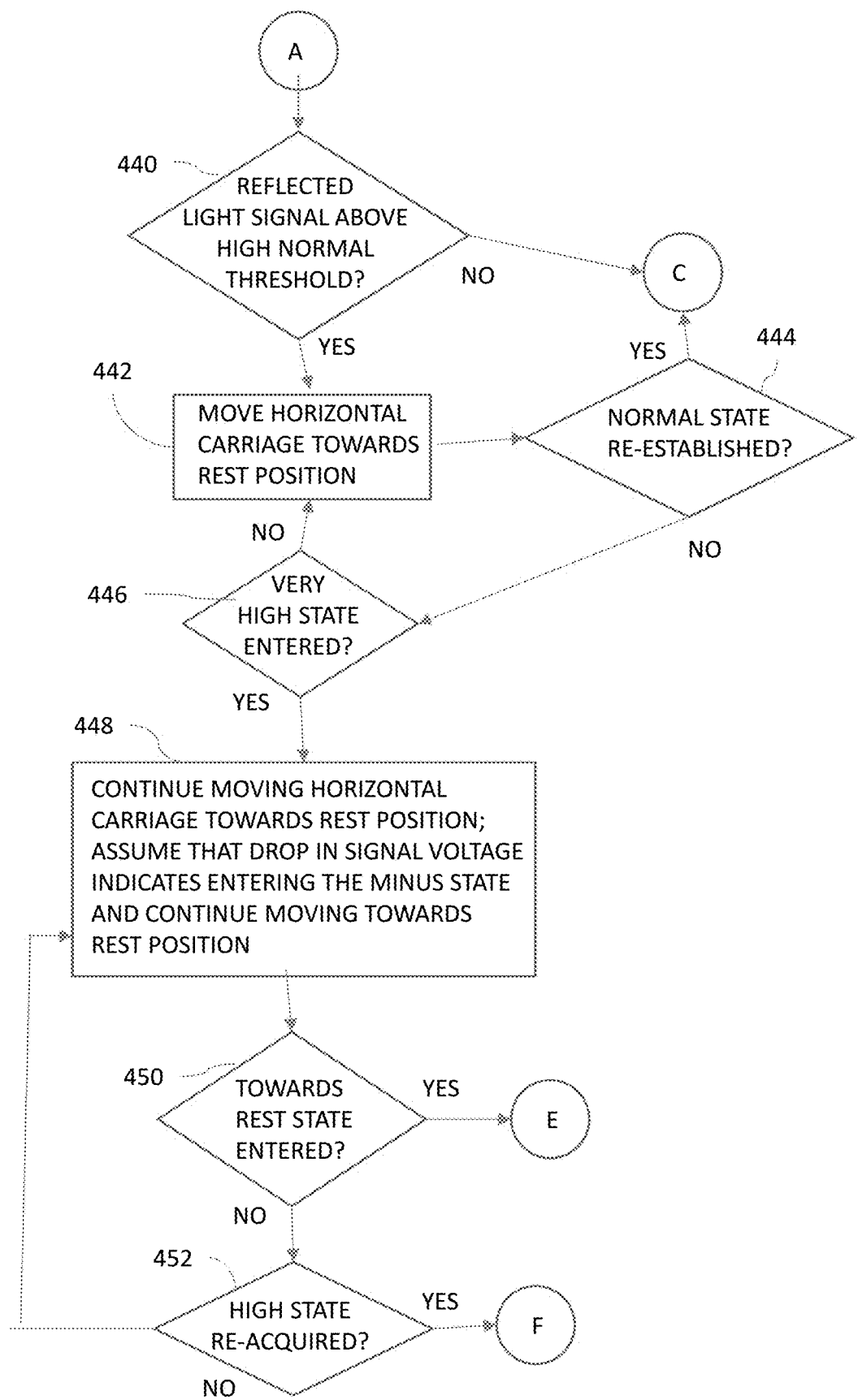
Figure 28C:
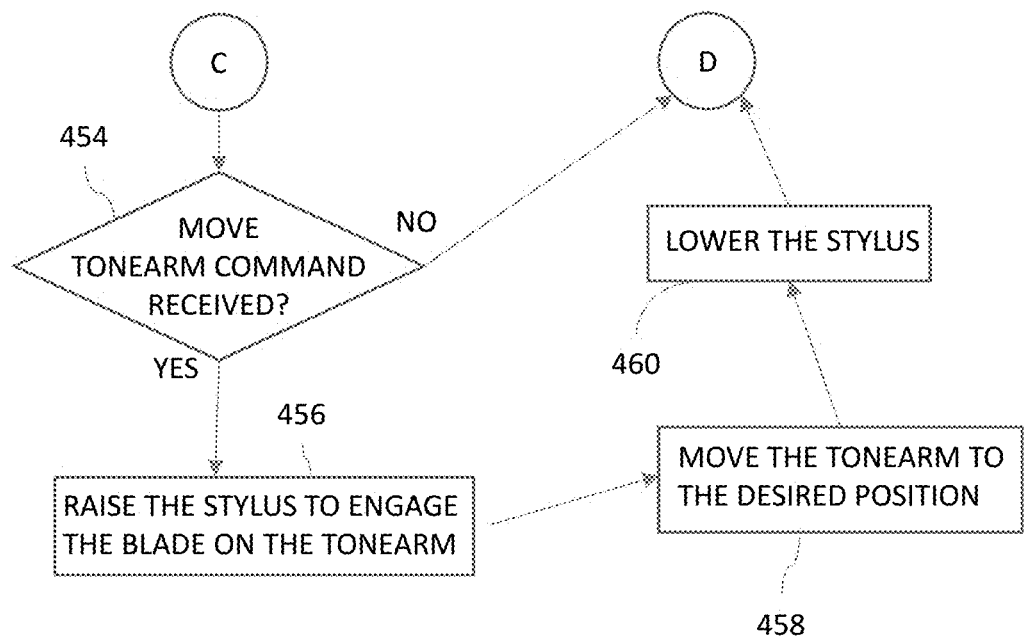
Figure 28D:
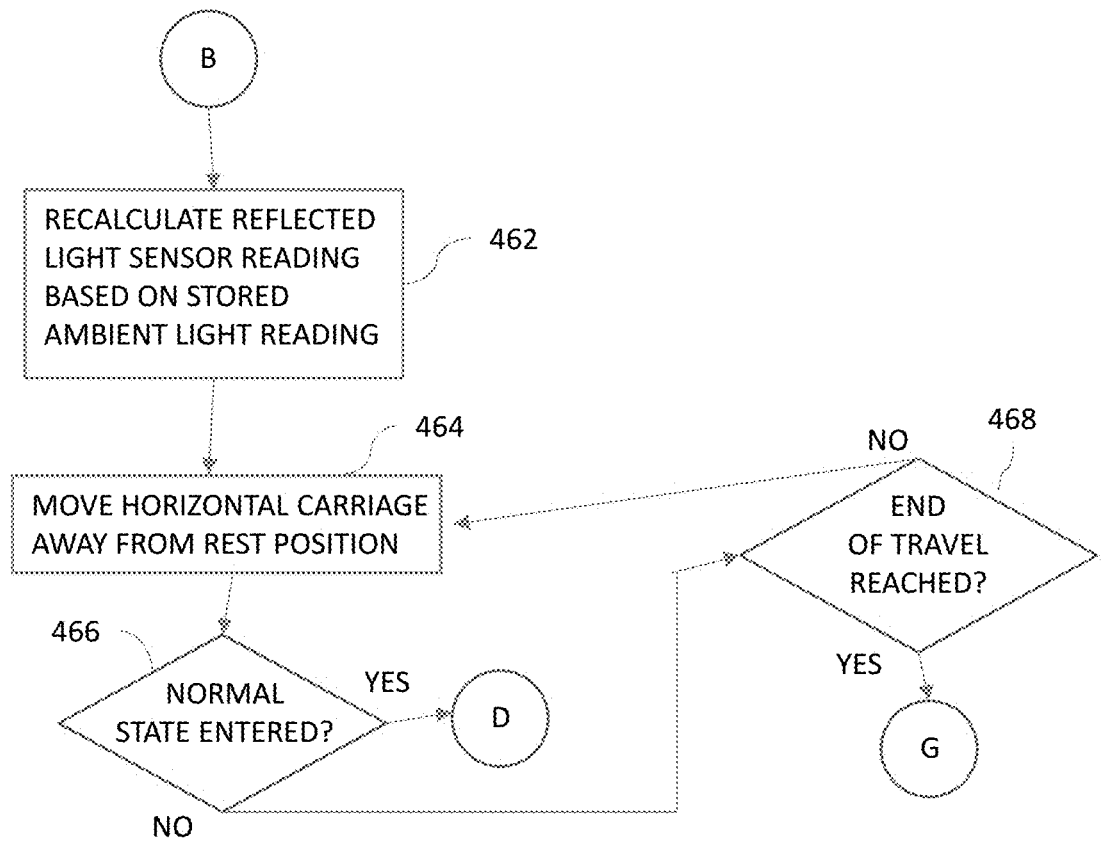
Figure 28E:
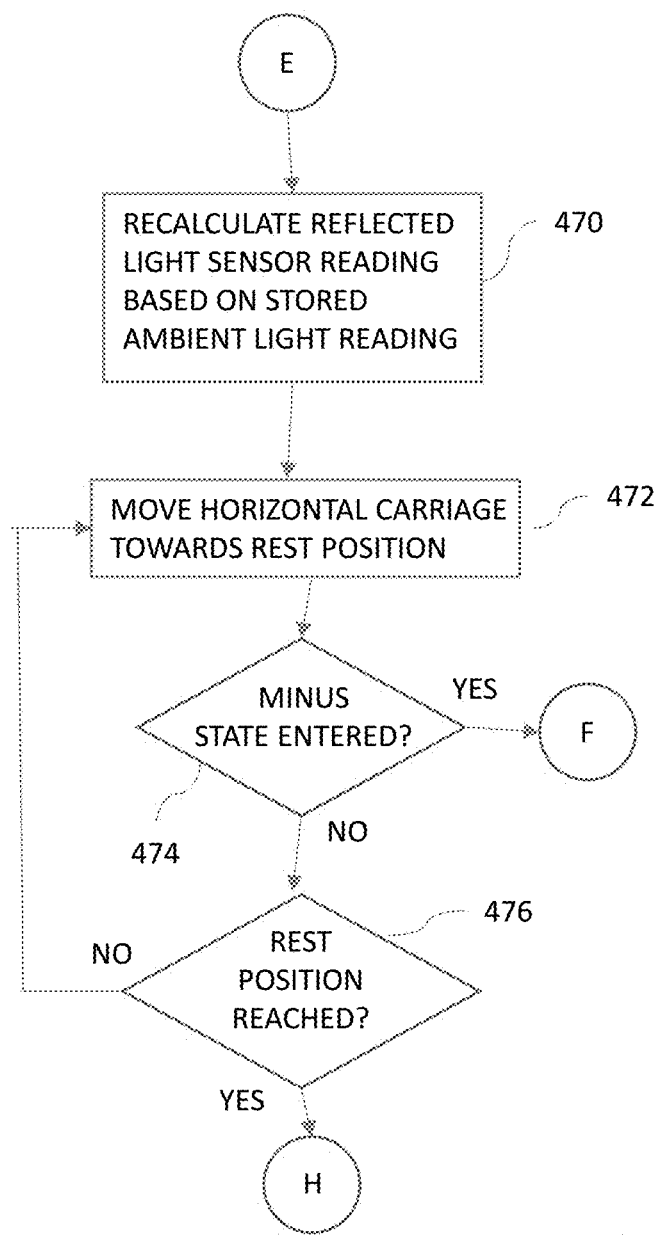

FIGS. 23-27 show distance represented on the X axis 402, and the voltage signal from the reflected light sensor 330 represented on the Y axis 404. FIGS. 23-27 include the voltage states curve 406 and the reflected light position indicator 408. The voltage states curve includes a normal state 410, a very high state 412 (which can also be a very high towards normal state, depending upon the direction from which the state is entered), A minus state 414, a towards lead out state 416, and a towards rest state 418. The stylus is properly located underneath the blade 24 of the tonearm 18 when the modified, digitized voltage from the reflected light sensor 330 is in the normal state 410. In this position, the stylus 326 will follow slightly behind the tonearm 18, so that movement of the tonearm 18 towards the center of the turntable 12 will result in a drop in the sensor voltage. Because the normal state 410 is along one edge of the curve, a small change in position results in a large change in voltage, resulting in greater accuracy and precision in positioning of the stylus 326. As the voltage decreases, the stylus 326 will also be moved towards the center of the turntable 12, or towards the left side of FIG. 23 to maintain the normal state 410. If by some chance the tonearm 18 has moved to rapidly in the lead out direction, as shown in FIG. 24, the result will be a low-voltage reading, causing the controller to drive the stylus 326 in the direction of the lead out groove of the record (which is the same direction as towards the center of the turntable 12).

In the event that the tonearm 18 moves in the opposite direction, towards the rest position, voltage will increase. In this instance, the stylus 326 will be moved towards the rest position in order to decrease the voltage, attempting to maintain the normal state 410. If the tonearm 18 moves to rapidly for the stylus 326 to keep up, then the very high state 412 (FIG. 25) will be entered, followed by the minus state 414 (FIG. 26), and lastly the towards rest state 418 (FIG. 27) indicating that the tonearm 18 has crossed over the stylus 326. In this instance, the stylus 326 will be moved towards the rest position of the tonearm 18, and will determine that the tonearm 18 has been reacquired after passing through the minus state 414, very high state 412, and back into the normal state 410. If by some chance the tonearm 18 has not been located, the stylus 326 will be returned to the opposite end of its range of travel, and then gradually moved back towards the rest position until the tonearm 18 is located.

In order to maximize the accuracy and precision with which the tonearm 18 can be tracked, the system takes into account the increase in light to which the ambient sensor 332 will be exposed in either the towards lead out state 416 or the towards rest state 418, in which case the ambient light sensor 332 will be completely uncovered by the blade 24. In order to resist any possibility of the increase in ambient light driving the signal from the reflected light sensor 330 into an incorrect normal state 410, the signal from the ambient light sensor 332 is stored, and continually updated. If either the towards lead out 416 or towards rest state 418 are entered, the stored value for the ambient light sensor 332 is used to modify the manner in which the signal from the reflected light sensor 330 is utilized by the controller 94, thus avoiding an incorrect interpretation of the reflected light sensor 330 signal. By understanding how the stored signal from the ambient light sensor 332 would affect the base 368 of the transistor 366, the signal from the light sensor 330 can be corrected through software or firmware to reflect the value that the signal would have if the stored value of the signal from the ambient light sensor 332 was the actual value from that sensor.

FIGS. 28A-28E illustrate the process steps followed by the controller 94 in locating and tracking the tonearm 18. Initially, the carriage 314 is moved to the end of travel opposite the rest position of the tonearm 18 at step 420. Next, the carriage 314 is moved in the opposite direction while looking for the reflective strip 36 at step 422. The system will expect to enter the normal state 410 by first entering the minus state 414, and then progressing through the very high state 412. Thus, the system will first look for the minus state 414 at step 424. In the event that the carriage 314 reaches the end of travel corresponding to the rest position of the tonearm 18 at step 426, the carriage 314 will again move to the opposite end of travel, and begin the search again with step 420. What's the minus state 414 is entered, the carriage 314 will continue moving towards the rest position through the very high state 412 at step 428. The system will look for the normal state 410 at step 430 continuing to move the carriage 314 and so the normal state 410 is entered.

Once the normal state 410 is entered, the system will begin looking for either the high 411 or low 413 threshold of the normal state 410, either of which indicates that moving the carriage 314 is required to remain in the normal state 410. If the low normal threshold 413 is encountered at step 432, the carriage 314 will be moved away from the rest position at step 434, and the ambient light sensor 332 reading will be stored at step 436. The system will check to see if the towards lead out state 416 has been entered at step 438. If not, then the system will continue to monitor for the low-level threshold 413 of the normal state 410, moving the carriage 314 accordingly. Similarly, if the high normal threshold 411 is encountered at step 440 the carriage 314 is moved towards the rest position at step 442. The system will check to see if the normal state 410 has been reestablished at step 444, and if not, will check to see if the very high state 412 is entered at step 446. In the event that the very high state 412 is entered, the carriage 314 will continue moving towards the rest position of the tonearm 18 at step 448. At this point, it will assume that the tonearm 18 has been manually moved, and that the next increase in signal voltage will indicate entering the minus state 414. With this in mind, the system will monitor for entering the towards rest state 418 at step 450, as well is checking to see if the high state 412 has been reacquired at step 452. If the high state 412 is reacquired, then the system will proceed back to step 428, and will otherwise continue moving the carriage 314 towards the rest position.

When the system is within the normal state 410, then the tonearm 18 can be moved by the controller 94 at any time such movement is desired. The system checks to see if a command to move the tonearm 18 has been received at step 454. If not, then the system returns to step 432 and continues to monitor for the thresholds of the normal range 410. If a command to move the tonearm 18 is received, then the vertical carriage 322 is moved at step 456 in order to raise the stylus 326 and engage the blade 24 of the tonearm 18. The carriage 314 is then moved at step 458 to move the tonearm 18 to the desired position. The vertical carriage 322 is then lowered at step 460 in order to lower the stylus 326. Once movement is complete, the system will return to step 432 to continue monitoring for the thresholds 411, 413 of the normal range 410.

if either the towards rest state 418 is entered, or if the towards lead out state 416 is entered, the system will rely on stored values of the ambient light sensor 332 instead of the current value of that sensor. With the ambient light sensor 332 completely out from underneath the blade 24, readings from the ambient light sensor 332 will be higher, potentially leading to an erroneous determination that the stylus 326 is underneath the tonearm 18. If the towards lead out state 416 has been entered at step 438, then the microcontroller 94 will begin by recalculating the reflected light sensor 330 reading based on the stored ambient light sensor 332 reading from when the ambient light sensor 332 was underneath the blade 24 of the tonearm 18 at step 462. The horizontal carriage 314 will be moved away from the rest position at step 464. If the normal state 410 is reentered at step 466, then the system will begin monitoring for the high 411 and low 413 normal thresholds beginning at step 432. Otherwise, the system will continue moving the horizontal carriage 314 away from the rest position at step 464 until either the normal state 410 is reentered at step 466, or until the end of travel is reached at step 468. Once the end of travel is reached, the system will return to step 422 and began looking to reacquire the tonearm 18.

Similarly, if the towards rest state 418 is entered at step 450, the system will recalculate the reflected light sensor 330 reading based on the stored ambient light sensor 332 reading at step 470. The horizontal carriage 314 will be moved towards the rest position at step 472. The system will monitor for the minus state 414 at step 474. If the minus state 414 is entered, then the system will return to step 428, continuing to move towards the rest position through the very high state 412 until the normal state 410 is entered. Otherwise, the system will continue moving the horizontal carriage 314 towards the rest position at step 472, checking to see if the minus state 414 is entered at step 474, as well is whether the rest position has been reached at step 476. If the rest position is reached, then the system will return to step 420, moving the horizontal carriage 314 back to the end of travel opposite the rest position, and will then reattempt to acquire the tonearm 18.

The device 10 therefore provides a means for converting a manual record player into an automatic record player. Because the only portion of the device 10 that is attached to the tonearm 18 is the lightweight blade 24, the sensitivity of the tonearm 18 is substantially unaffected by the use of the device 10. Thus, the functionality of an automatic record player can be combined with the sensitivity of a manual record player. The device 10 can be installed on a record player without permanent modification of the record player. Some examples of the device 10 provide a means for creating data about the starting point of songs on an individual record. In some examples, this data can be used exclusively locally. In other examples, the static can be converted into a form that can be uploaded into an Internet database, and shared with other users of other devices 10. Some examples take ambient light into account in determining whether the reflected light sensor is receiving light reflected from the blade, so that the blade can be accurately tracked in a wide variety of lighting conditions.

Although the description above is based on a conversion device for converting a manual record player to an automatic record player, a record player may be originally supplied in automatic form, with a portion of the record player controlling tonearm movement essentially as described above, without departing from the scope of the invention. For the purpose of the specification and claims herein, an automatic record player includes either a record player that is originally supplied in automatic form, or a manual record player that is converted to automatic form by a conversion device as described herein.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A circuit for monitoring light, the circuit comprising:
a first light sensor;
a second light sensor;
an operational amplifier having a non-inverting input, an inverting input, and an output, the non-inverting input being electrically connected to the second light sensor, the inverting input being electrically connected to a voltage source, the inverting input also being electrically connected to the output of the operational amplifier;

a first transistor having a first base, a first collector, and a first emitter, the first base being electrically connected to the output of the operational amplifier, the first collector being electrically connected to the second light sensor, and the first emitter being electrically connected to ground;

a second transistor having a second base, a second collector, and a second emitter, the second base being electrically connected to the output of the operational amplifier, the second collector being electrically connected to the first light sensor, and the second emitter being electrically connected to ground; and the first light sensor and second collector being electrically connected to a first circuit output;

whereby the voltage provided to the output by the first light sensor is modified by the voltage provided by the second light sensor.

2. The circuit according to claim 1, wherein the output of the operational amplifier is electrically connected to a second circuit output.

\* \* \* \* \*